(12) United States Patent
He et al.

(10) Patent No.: US 12,500,631 B2
(45) Date of Patent: Dec. 16, 2025

(54) COMMUNICATION METHOD AND APPARATUS

(71) Applicant: HUAWEI TECHNOLOGIES CO., LTD., Shenzhen (CN)

(72) Inventors: Hongli He, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 18/263,108

(22) PCT Filed: Dec. 9, 2021

(86) PCT No.: PCT/CN2021/136655
§ 371 (c)(1),
(2) Date: Jul. 26, 2023

(87) PCT Pub. No.: WO2022/160963
PCT Pub. Date: Aug. 4, 2022

(65) Prior Publication Data
US 2024/0088953 A1 Mar. 14, 2024

(30) Foreign Application Priority Data

Jan. 27, 2021 (CN) .......................... 202110112579.0
May 19, 2021 (CN) .......................... 202110544164.0

(51) Int. Cl.
*H04B 7/0456* (2017.01)
*H04B 7/06* (2006.01)
*H04L 5/00* (2006.01)

(52) U.S. Cl.
CPC ......... *H04B 7/0456* (2013.01); *H04B 7/0626* (2013.01); *H04B 7/063* (2013.01); *H04B 7/06952* (2023.05); *H04L 5/0048* (2013.01)

(58) Field of Classification Search
CPC .... H04B 7/0456; H04B 7/0626; H04B 7/063; H04B 7/06952; H04L 5/0048; H04L 25/0204; H04L 5/0094
See application file for complete search history.

(56) References Cited

U.S. PATENT DOCUMENTS 10,250,309 B2 * 4/2019 Truong ................ H04B 7/0469
11,271,631 B2 * 3/2022 Chen ....................... H04L 1/189
(Continued)

FOREIGN PATENT DOCUMENTS

EP          4351031 A2 *  4/2024  ........... H04L 5/0051

OTHER PUBLICATIONS

"3rd Generation Partnership Project; Technical Specification Group Radio Access Network; Study on channel model for frequencies from 0.5 to 100 GHz (Release 16)," 3GPP TR 38.901 V16.1.0, total 101 pages (Dec. 2019).

(Continued)

*Primary Examiner* — Mounir Moutaouakil
(74) *Attorney, Agent, or Firm* — Leydig, Voit & Mayer, Ltd.

(57) ABSTRACT

A communication method and apparatus are provided. The method includes: receiving configuration information from a first device, wherein the configuration information includes first information, second information, and third information, the first information is indication information of K reference signals, the second information is indication information of K first spatial filtering parameters corresponding to the K reference signals, and the third information is indication information of a channel sparse basis matrix of channels between the first device and a second device; receiving the K reference signals from the first device; and sending channel state indication information to the first device, where the channel state indication information is determined (Continued)

based on K received measurement values of the K reference signals, the K first spatial filtering parameters, and the channel sparse basis matrix.

20 Claims, 4 Drawing Sheets

(56) References Cited

U.S. PATENT DOCUMENTS

| | | | |
|---|---|---|---|
| 2022/0086694 A1* | 3/2022 | Kons | H04W 16/02 |
| 2024/0146359 A1* | 5/2024 | Sun | H04L 27/2639 |
| 2024/0187283 A1* | 6/2024 | Chai | H04L 27/26025 |
| 2025/0225443 A1* | 7/2025 | Tian | H04W 16/22 |
| 2025/0227490 A1* | 7/2025 | Li | H04B 7/0626 |

OTHER PUBLICATIONS

Nokia et al., "On the phase noise model for 5G New Radio evaluation," 3GPP TSG-RAN WG1 Meeting #84bis, R1-162885, Busan, Korea, Total 4 pages (Apr. 11-15, 2016).

\* cited by examiner

COMMUNICATION METHOD AND APPARATUS

CROSS-REFERENCE TO RELATED APPLICATIONS

This application is a National Stage of International Patent Application No. PCT/CN2021/136655 filed on Dec. 9, 2021, which claims priority to Chinese Patent Application No. 202110112579.0 filed on Jan. 27, 2021 and Chinese Patent Application No. 202110544164.0 filed on May 19, 2021. All of the aforementioned applications are hereby incorporated by reference in their entireties.

TECHNICAL FIELD

Embodiments of this application relate to the field of communication technologies, and in particular, to a communication method and apparatus.

BACKGROUND

In a new radio (NR) system, a beam training procedure between a base station and a terminal device is completed by using a channel state information (CSI) reporting procedure. A main procedure is that the base station configures a plurality of reference signals for the terminal device, including information such as a time-frequency position of each reference signal, a reference signal index, and a quantity of ports. The base station may send reference signals by using different spatial filtering parameters, that is, send the reference signals in different beam directions. The terminal device receives each reference signal configured by the base station, measures reference signal received power (RSRP) of the reference signal, and then reports reference signal indexes of several reference signals with relatively high RSRP and quantized RSRP values corresponding to the several reference signals. After the base station receives information reported by the terminal device, because the base station knows spatial filtering parameters used for sending reference signals, the base station can finally determine which spatial filtering parameters are used for sending signals in which directions, so that the terminal device can receive a relatively high-energy signal, and finally complete the beam training procedure.

An existing beam training procedure in NR generally includes two stages. In a first stage, the base station periodically sends a synchronization signal/physical broadcast channel block (SSB). In one period, transmission directions of SSBs are different, and a transmission direction of each SSB may be considered as one beam. The terminal device may measure the SSBs to determine an SSB with a relatively desirable measurement result. In a second stage, the base station may divide a beam direction of the SSB determined by the terminal device into a plurality of narrow beams with a relatively narrow width, continue to send a non-zero power channel state information reference signal (NZP-CSI-RS) in each narrow beam direction, and then determine, based on NZP-CSI-RS measurement information reported by the terminal device, a relatively desirable narrow beam direction, namely, a beam direction actually used for subsequent data transmission.

In the foregoing beam training procedure, because a plurality of paths exist when wide beam sweeping is used in the first stage, an optimal wide beam may not include an optimal narrow beam. In addition, the base station needs to send a signal for a plurality of times, and the terminal device needs to perform measurement for a plurality of times, causing relatively large overheads.

SUMMARY

This application provides a communication method and apparatus, to resolve a problem of relatively large beam training overheads.

According to a first aspect, this application provides a communication method. The method is applicable to a scenario in which beam training is performed in sidelink communication. The method is performed by a second device or a chip or a module in the second device. Herein, an example in which the method is performed by the second device is used for description. The method includes: The second device receives configuration information from a first device, where the configuration information includes first information, second information, and third information, the first information is indication information of K reference signals, the second information is indication information of K first spatial filtering parameters corresponding to the K reference signals, the third information is indication information of a channel sparse basis matrix of channels between the first device and the second device, and K is an integer greater than 1. The second device receives the K reference signals from the first device. The second device sends channel state indication information to the first device, where the channel state indication information is determined based on K received measurement values of the K reference signals, the K first spatial filtering parameters, and the channel sparse basis matrix.

According to the method, in addition to the indication information of the reference signals, the configuration information further includes the indication information of the first spatial filtering parameters used by the first device for sending the reference signals and the indication information of the channel sparse basis matrix. Based on the information, the first device needs to send only a small quantity of reference signals, and the second device can complete channel estimation based on the configuration information, and then determine the channel state indication information based on an estimated channel, thereby reducing reference signal overheads and time overheads.

In a possible implementation, there is a correspondence between one of the K reference signals and one of the K first spatial filtering parameters.

In a possible implementation, the second information includes K row indexes or column indexes in an analog precoding codebook, the K row indexes or column indexes indicate K analog precoding vectors in the analog precoding codebook, the K first spatial filtering parameters are K analog precoding vectors indicated by the second information, and the analog precoding codebook is preconfigured or configured by default.

In a possible implementation, the third information includes an antenna array size of the first device, and the channel sparse basis matrix is determined based on a discrete Fourier transform matrix corresponding to the antenna array size of the first device.

In a possible implementation, the configuration information further includes fourth information, the fourth information is indication information of K phase tracking reference signals, and one of the K phase tracking reference signals and one of the K reference signals are transmitted in a same time unit.

According to the method, a phase of a reference signal is corrected by using a received phase tracking reference signal, and phase information caused by a channel in the received reference signal may be retained. In this way, subsequent channel estimation and beam training can be more accurate.

In a possible implementation, the method further includes: receiving the K phase tracking reference signals from the first device, where the K phase tracking reference signals are sent by using a same spatial filtering parameter, and the spatial filtering parameter is one of the K first spatial filtering parameters, or the spatial filtering parameter is a spatial filtering parameter different from the K first spatial filtering parameters.

Phase noise on different symbols in a beam training procedure can be eliminated by using the phase tracking reference signal, thereby improving beam training precision.

In a possible implementation, the channel state indication information includes a quantized value of an estimation value of an angle domain channel, the estimation value of the angle domain channel is determined based on the K received measurement values of the K reference signals, the K first spatial filtering parameters, and the channel sparse basis matrix, and the quantized value of the estimation value of the angle domain channel includes a value obtained by quantizing an amplitude and a phase of at least one element in the estimation value of the angle domain channel, or includes a value obtained by quantizing a real part and an imaginary part of at least one element in the estimation value of the angle domain channel. Alternatively, the channel state indication information includes a quantized value of an estimation value of a channel, the estimation value of the channel is determined based on the K received measurement values of the K reference signals, the K first spatial filtering parameters, and the channel sparse basis matrix, and the quantized value of the estimation value of the channel includes a value obtained by quantizing an amplitude and a phase of at least one element in the estimation value of the channel, or includes a value obtained by quantizing a real part and an imaginary part of at least one element in the estimation value of the channel.

In a possible implementation, the channel state indication information further includes at least one of the following information: an index of the at least one element of the estimation value of the angle domain channel in the estimation value of the angle domain channel, or a snapshot index of the channel.

In a possible implementation, the estimation value $\hat{x}$ of the angle domain channel meets the following form:

$$\hat{x} = \min_x |x|_0 \text{ s.t. } |y - MDx|^2 \le \epsilon$$

y is a received signal, M is a matrix including the K first spatial filtering parameters, D is the channel sparse basis matrix of the channels between the first device and the second device that is indicated by the third information, and E is a preset value.

In a possible implementation, the configuration information may further include fifth information, and the fifth information is used to indicate a plurality of second spatial filtering parameters.

In a possible implementation, the channel state indication information includes at least one second spatial filtering parameter in the plurality of second spatial filtering parameters or an index of the at least one second spatial filtering parameter in the plurality of second spatial filtering parameters. Alternatively, the channel state indication information includes at least one second spatial filtering parameter in the plurality of second spatial filtering parameters or an index of the at least one second spatial filtering parameter in the plurality of second spatial filtering parameters, and a quantized channel gain value corresponding to the at least one second spatial filtering parameter. The at least one second spatial filtering parameter and the quantized channel gain value corresponding to the at least one second spatial filtering parameter are determined based on the K received measurement values of the K reference signals, the K first spatial filtering parameters, and the channel sparse basis matrix.

According to a second aspect, this application provides a communication method. The method is applicable to a scenario in which beam training is performed in sidelink communication. The method is performed by a first device or a chip or a module in the first device. Herein, an example in which the method is performed by the first device is used for description. The method includes: The first device sends configuration information to a second device, where the configuration information includes first information, second information, and third information, the first information indicates K reference signals, the second information indicates K first spatial filtering parameters corresponding to the K reference signals, and the third information indicates a channel sparse basis matrix of channels between the first device and the second device. The first device sends the K reference signals to the second device. The first device receives channel state indication information from the second device, where the channel state indication information is determined based on K received measurement values of the K reference signals, the K first spatial filtering parameters, and the channel sparse basis matrix.

In a possible implementation, the sending the K reference signals to the second device includes: sending one of the K reference signals by using one of the K first spatial filtering parameters.

In a possible implementation, the second information includes K row indexes or column indexes in an analog precoding codebook, the K row indexes or column indexes indicate K analog precoding vectors in the analog precoding codebook, the K first spatial filtering parameters are K analog precoding vectors indicated by the second information, and the analog precoding codebook is preconfigured or configured by default.

In a possible implementation, the third information includes an antenna array size of the first device, and the channel sparse basis matrix is determined based on a discrete Fourier transform matrix corresponding to the antenna array size of the first device.

In a possible implementation, the configuration information further includes fourth information, the fourth information is indication information of K phase tracking reference signals, and one of the K phase tracking reference signals and one of the K reference signals are transmitted in a same time unit.

In a possible implementation, the method further includes: sending the K phase tracking reference signals to the second device by using a same spatial filtering parameter, where the spatial filtering parameter is one of the K first spatial filtering parameters, or the spatial filtering parameter is a spatial filtering parameter different from the K first spatial filtering parameters.

In a possible implementation, the channel state indication information includes a quantized value of an estimation value of an angle domain channel, the estimation value of the angle domain channel is determined based on the K received measurement values of the K reference signals, the K first spatial filtering parameters, and the channel sparse basis matrix, and the quantized value of the estimation value of the angle domain channel includes a value obtained by quantizing an amplitude and a phase of at least one element in the estimation value of the angle domain channel, or includes a value obtained by quantizing a real part and an imaginary part of at least one element in the estimation value of the angle domain channel. Alternatively, the channel state indication information includes a quantized value of an estimation value of a channel, the estimation value of the channel is determined based on the K received measurement values of the K reference signals, the K first spatial filtering parameters, and the channel sparse basis matrix, and the quantized value of the estimation value of the channel includes a value obtained by quantizing an amplitude and a phase of at least one element in the estimation value of the channel, or includes a value obtained by quantizing a real part and an imaginary part of at least one element in the estimation value of the channel.

In a possible implementation, the channel state indication information further includes at least one of the following information: an index of the at least one element of the estimation value of the angle domain channel in the estimation value of the angle domain channel, or a snapshot index of the channel.

In a possible implementation, the estimation value $\hat{x}$ of the angle domain channel meets the following form:

$$\hat{x} = \min_{x}|x|_0 \text{ s.t. } |y - MDx|^2 \le \epsilon$$

y is a received signal, M is a matrix including the K first spatial filtering parameters, D is the channel sparse basis matrix of the channels between the first device and the second device that is indicated by the third information, and $\epsilon$ is a preset value.

In a possible implementation, the configuration information may further include fifth information, and the fifth information is used to indicate a plurality of second spatial filtering parameters.

In a possible implementation, the channel state indication information includes at least one second spatial filtering parameter in the plurality of second spatial filtering parameters or an index of the at least one second spatial filtering parameter in the plurality of second spatial filtering parameters. Alternatively, the channel state indication information includes at least one second spatial filtering parameter in the plurality of second spatial filtering parameters or an index of the at least one second spatial filtering parameter in the plurality of second spatial filtering parameters, and a quantized channel gain value corresponding to the at least one second spatial filtering parameter. The at least one second spatial filtering parameter and the quantized channel gain value corresponding to the at least one second spatial filtering parameter are determined based on the K received measurement values of the K reference signals, the K first spatial filtering parameters, and the channel sparse basis matrix.

According to a third aspect, this application provides a communication apparatus. The communication apparatus may perform the method according to any one of the first aspect or the possible implementations of the first aspect.

In a possible design, the apparatus includes one or more processing units and a communication unit. The one or more processors are configured to support the apparatus to perform a corresponding function of the second device in the foregoing method. The communication unit is configured to support the apparatus to communicate with another device, to implement a receiving function and/or a sending function, for example, to receive configuration information.

In a possible design, the communication unit is configured to: receive configuration information from a first device, where the configuration information includes first information, second information, and third information, the first information is indication information of K reference signals, the second information is indication information of K first spatial filtering parameters corresponding to the K reference signals, the third information is indication information of a channel sparse basis matrix of channels between the first device and the second device, and K is an integer greater than 1; and receive the K reference signals from the first device.

The processing unit is configured to determine channel state indication information based on K received measurement values of the K reference signals, the K first spatial filtering parameters, and the channel sparse basis matrix.

The communication unit is configured to send the channel state indication information to the first device.

Optionally, the apparatus may further include one or more memories. The memory is coupled to the processor and stores program instructions and/or data necessary for a network device. The one or more memories may be integrated with the processor or be disposed independent of the processor. This is not limited in this application.

The apparatus may be a base station, a gNB, a TRP, or the like. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver to receive and send a signal. The memory is configured to store a computer program. The processor is configured to run the computer program in the memory, so that the apparatus performs the method implemented by the second device according to any one of the first aspect or the possible implementations of the first aspect.

According to a fourth aspect, this application provides a communication apparatus. The communication apparatus may perform the method according to any one of the second aspect or the possible implementations of the second aspect.

In a possible design, the apparatus includes one or more processors and a communication unit. The one or more processors are configured to support the apparatus to perform a corresponding function of the first device in the foregoing method. The communication unit is configured to support the apparatus to communicate with another device, to implement a receiving function and/or a sending function.

In a possible design, the processing unit is configured to: send configuration information to a second device through the communication unit, where the configuration information includes first information, second information, and third information, the first information indicates K reference signals, the second information indicates K first spatial filtering parameters corresponding to the K reference signals, and the third information indicates a channel sparse basis matrix of channels between a first device and the second device; and send the K reference signals to the second device.

The processing unit is configured to receive channel state indication information from the second device through the communication unit, where the channel state indication information is determined based on K received measurement values of the K reference signals, the K first spatial filtering parameters, and the channel sparse basis matrix.

Optionally, the apparatus may further include one or more memories. The memory is coupled to the processor and stores program instructions and/or data necessary for a network device. The one or more memories may be integrated with the processor or be disposed independent of the processor. This is not limited in this application.

The apparatus may be a base station, a gNB, a TRP, or the like. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver to receive and send a signal. The memory is configured to store a computer program. The processor is configured to run the computer program in the memory, so that the apparatus performs the method implemented by the first device according to any one of the second aspect or the possible implementations of the second aspect.

According to a fifth aspect, this application provides a beam training method, including: A sending device sends a reference signal, where reference information includes indication information of a spatial filtering parameter and a channel sparse basis matrix, and indication information of an available spatial filtering parameter set of a sending device. A receiving device may complete channel estimation based on configuration information and a compressive sensing recovery algorithm. The receiving device determines an optimal transmission beam based on an estimated channel.

According to a sixth aspect, a communication apparatus is provided, including a processor and an interface circuit. The interface circuit is configured to: receive a signal from another communication apparatus different from the communication apparatus and transmit the signal to the processor, or send a signal from the processor to another communication apparatus different from the communication apparatus. The processor is configured to execute a computer program or instructions stored in a memory, to implement the method according to any one of the first aspect or the possible implementations of the first aspect.

According to a seventh aspect, a communication apparatus is provided, including a processor and an interface circuit. The interface circuit is configured to: receive a signal from another communication apparatus different from the communication apparatus and transmit the signal to the processor, or send a signal from the processor to another communication apparatus different from the communication apparatus. The processor is configured to execute a computer program or instructions stored in a memory, to implement the method according to any one of the second aspect or the possible implementations of the second aspect.

According to an eighth aspect, a computer-readable storage medium is provided. The computer-readable storage medium stores a computer program or instructions. When the computer program or the instructions are run on a computer, the computer is enabled to implement the method according to any one of the first aspect or the possible implementations of the first aspect.

According to a ninth aspect, a computer-readable storage medium is provided. The computer-readable storage medium stores a computer program or instructions. When the computer program or the instructions are run on a computer, the computer is enabled to implement the method according to any one of the second aspect or the possible implementations of the second aspect.

According to a tenth aspect, a computer program product storing computer-readable instructions is provided. When the computer-readable instructions are run on a computer, the computer is enabled to implement the method according to any one of the first aspect or the possible implementations of the first aspect.

According to an eleventh aspect, a computer program product storing computer-readable instructions is provided. When the computer-readable instructions are run on a computer, the computer is enabled to implement the method according to any one of the second aspect or the possible implementations of the second aspect.

According to a twelfth aspect, a chip is provided. The chip includes a processor, and may further include a memory, configured to execute a computer program or instructions stored in the memory, so that the chip implements the method according to any one of the first aspect, the second aspect, or the possible implementations of the first aspect or the second aspect.

According to a thirteenth aspect, a communication system is provided. The system includes the apparatus (for example, the second device) according to the sixth aspect and the apparatus (for example, the first device) according to the seventh aspect.

DESCRIPTION OF EMBODIMENTS

Figure 1:
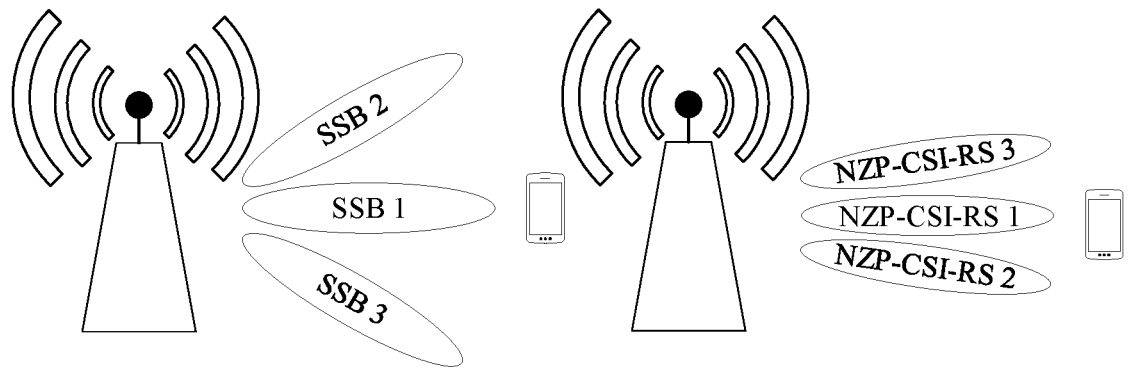
FIG. 1 is a schematic diagram of beam training according to an embodiment of this application.

The following describes embodiments of this application in detail with reference to accompanying drawings of this specification.

Embodiments of this application may be applied to various mobile communication systems, including but not limited to a 4G system, a 5G system, a 5G sidelink (SL) system, a 5G evolved system, and a 5G evolved SL system. The 5G system includes a new radio (NR) system, and the 4G system includes a global system for mobile communications (GSM), a long term evolution (LTE) system, and the like. Specifically, this is not limited herein.

Related acronyms and definitions of key terms in this application may be shown in Table 1.

TABLE 1

|  | Full English expression/ Standard English term | English acronym |
|---|---|---|
| Channel state information | Channel state information | CSI |
| Reference signal | Reference signal | RS |
| New radio technology (which may be referred to as new radio for short) | New radio | NR |

This application may be applied to communication in a millimeter wave band. The millimeter wave band is generally considered as an electromagnetic wave band whose frequency range is from 30 GHz to 300 GHz. Compared with a conventional sub-6 GHz frequency band, the millimeter wave band has a wider spectrum resource and can support transmission with a high data rate. In addition, a wavelength of a millimeter wave is short, so that an antenna size is smaller and multi-antenna integration is more convenient. Therefore, millimeter wave communication is a key technology in the 5G system and a future communication system.

However, compared with the conventional sub-6 GHz frequency band, the millimeter wave band has extremely large channel attenuation. Therefore, a device that performs communication in the millimeter wave band needs to use beamforming or another technology and use a specific spatial filtering parameter to enable signal energy to be concentrated in a specific direction, namely, a specific beam direction, to improve an equivalent channel gain between a receiving device and a sending device, thereby ensuring coverage performance and a data transmission rate of millimeter wave communication. Generally, it is considered that there is a correspondence between a beam and a spatial filtering parameter in the case of a given antenna structure. In an initial phase in which the receiving device and the sending device establish a connection, because information, such as a position and a channel, is usually unknown between the receiving device and the sending device, the receiving device needs to perform a beam training procedure to find a proper beam direction and a spatial filtering parameter corresponding to the beam direction. Currently, a mainstream beamforming technology in the NR system depends on a precoding technology in a multi-antenna structure. Precoding is mainly classified into digital precoding and analog precoding. Digital precoding depends on a plurality of radio frequency channels. However, because costs of the radio frequency channel are relatively high, a beamforming gain implemented by using only a few radio frequency channels through digital precoding is relatively low. Currently, a beamforming gain of a device mainly depends on analog precoding. A wideband signal passes through a phase shifter before being sent by each antenna element. A phase of a single sent by each antenna is different from a phase of an original signal. Different phase differences form an analog precoding vector, so that signals can be concentrated in a specific direction in terms of space. In an analog precoding framework, the analog precoding vector is a spatial filtering parameter. In the following of the present invention, unless otherwise specified, the spatial filtering parameter may be equivalent to the analog precoding vector. In an analog precoding technology, signals in an entire wideband on a symbol can be sent only by using a same analog precoding vector. Therefore, searching for all possible beam directions in a beam training phase requires consumption of a lot of time. Consequently, beam training overheads are large, transmission efficiency is low, and mobility support is poor.

In some embodiments, a beam training procedure between a base station and a terminal device in the NR system is completed by using a channel state information reporting (CSI-reporting) procedure. A main procedure is that the base station first configures a plurality of reference signals for the terminal device, including information such as a time-frequency position of each reference signal, a reference signal index, and a quantity of ports. The base station may send reference signals by using different spatial filtering parameters, that is, send the reference signals in different beam directions. The terminal device receives each reference signal configured by the base station, measures reference signal received power (RSRP) of the reference signal, and then reports reference signal indexes of several reference signals with relatively high RSRP and quantized RSRP values corresponding to the several reference signals. After the base station receives information reported by the terminal device, because the base station knows spatial filtering parameters used for sending reference signals, the base station can finally determine which spatial filtering parameters are used for sending signals in which directions, so that the terminal device can receive a relatively high-energy signal, and finally complete the beam training procedure.

In the NR system, there are two types of reference signals used for beam training. A first type is a synchronization signal/physical broadcast channel block (SSB), and a second type is a non-zero power channel state information reference signal (NZP-CSI-RS). The SSB is a cell-specific periodic reference signal. Each base station periodically sends the reference signal, which is mainly used for synchronization between the terminal device and the base station and broadcasting some basic configuration information in a cell. In consideration of transmission robustness, the base station usually uses a beam that is thicker than a beam used during data transmission, to send the SSB. The NZP-CSI-RS may be configured for a specific user, and a thickness and a shape of a beam used for sending the NZP-CSI-RS are not limited. Based on this, in an actual system, as shown in FIG. 1, the base station usually first enables the terminal device to measure periodic SSBs to determine a relatively good and wide transmit beam direction. Then, the base station configures several NZP-CSI-RSs for the user, continues to send the NZP-CSI-RS through a narrow beam direction in the determined wide beam direction, and then determines, based on NZP-CSI-RS measurement information reported by the user, a relatively good narrow beam direction, namely, a beam direction for data transmission. Compared with beam training directly performed based on a narrow beam, a two-stage beam training procedure requires fewer beams to be searched, so that time overheads of beam training can be reduced to some extent.

In the foregoing beam training method: (1) Time overheads in the first stage are still relatively large. The method depends on SSB measurement information in the first stage, and the SSB is a cell-specific periodic reference signal, and a period of the SSB is generally fixed and relatively long. For example, a transmission period of a round of SSBs (covering SSBs in all wide beam directions) in NR currently ranges from 5 ms to 120 ms. Therefore, although the two-stage search method can significantly reduce a quantity of beams to be searched, a relatively fixed time-frequency position configuration of the SSB causes relatively large time overheads in the first stage.

(2) A wide beam direction determined based on the SSB measurement information in the first stage may not include an actually best narrow beam direction. Consequently, performance of a finally determined narrow beam direction is not optimal. There are usually a plurality of paths on channels between the base station and the terminal device. When the SSB is sent in a wide beam direction in the first stage, the wide beam direction may include a plurality of relatively strong paths. If phases of the plurality of paths have a phase cancellation relationship, relatively low RSRP measured by the terminal device at a time-frequency position corresponding to the SSB tends to be caused. Consequently, detection on a valid path may be missed. However, when a beam direction used by the base station is narrow enough, different paths can be covered by different beam directions. To be specific, directly using measurement information of a narrow beam ensures that a found narrow beam direction is an actually best narrow beam direction. Therefore, the wide beam direction determined based on the SSB measurement information in the first stage may not include an actually best narrow beam direction. Consequently, performance of the finally determined narrow beam direction is not optimal.

Because both reflection attenuation and penetration attenuation of a millimeter wave are extremely large, a quantity of a plurality of paths in a millimeter wave channel is generally relatively small. Therefore, the millimeter wave channel may be considered as sparse in angle domain. Based on an assumption that the millimeter wave band is sparse in angle domain, in the present invention, a channel is preliminarily estimated directly by using a compressive sensing algorithm, and then a transmit beam direction is determined by using a channel obtained through estimation and a preset spatial filtering parameter set. Based on this, embodiments of this application relate to the following aspects.

1. A sending device sends configuration information to a receiving device. The configuration information includes time-frequency positions of K channel state information reference signals (CSI-RS), indication information of K spatial filtering parameters corresponding to the K CSI-RSs, indication information of a channel sparse basis matrix, and indication information of an available spatial filtering parameter set of a sending device.

2. To eliminate phase noise of the CSI-RSs on different symbols, a phase tracking reference signal (PTRS) associated with the K CSI-RSs is further configured.

3. Based on the received CSI-RS, the configuration information of the sending device, and the corresponding compressive sensing recovery algorithm, the receiving device estimates a channel and performs reporting.

Method 1: Indication information of the estimated channel;

Method 2: Determine at least one optimal spatial filtering parameter based on the estimated channel and the available spatial filtering parameter set configured by the sending device, and then report information indicating the spatial filtering parameter.

In this application, the terminal device is a device having a wireless transceiver function or a chip that may be disposed in the terminal device, and may also be referred to as a device. The terminal device having a wireless transceiver function may also be referred to as user equipment (UE), customer premises equipment (CPE), a relay, an access terminal device, a user unit, a user station, a mobile station, a remote station, a remote terminal device, a mobile device, a user terminal device, a user agent, or a user apparatus. In actual application, the terminal device in embodiments of this application may be a mobile phone, a tablet computer (Pad), a computer with a wireless transceiver function, a virtual reality (VR) terminal device, an augmented reality (AR) terminal device, a wireless terminal device in industrial control, unmanned driving, telemedicine (remote medical), smart grid, transportation safety, smart city, and smart home, or the like. An application scenario is not limited in embodiments of this application. In this application, the terminal device having a wireless transceiver function and the chip that may be disposed in the device are collectively referred to as the terminal device.

In this application, a network device may be a radio access device in various standards. For example, the network device in this application may be a next generation base station (next Generation NodeB, gNB) in the NR system, an evolved NodeB (eNB), a radio network controller (RNC), a NodeB (NB) or a base station, a base station controller (BSC), a base transceiver station (BTS), a home base station (for example, a home evolved NodeB or a home NodeB, HNB), a baseband unit (BBU), an SL unit, or an access point (AP), a wireless relay node, a wireless backhaul node, a transmission point (transmission/reception point, TRP, or transmission point, TP), or the like in a wireless fidelity (Wi-Fi) system. The network device may also be a gNB or a transmission point (TRP or TP) in the 5G (NR) system, one or a group of (including a plurality of antenna panels) antenna panels of a base station in the 5G system, or a network node that functions as a gNB or a transmission point, for example, a baseband unit (BBU), or a DU in a central-distributed (CU-DU) architecture.

This application may be widely applied to various scenarios, for example, cellular communication, sidelink (SL) communication, device-to-device (D2D) communication, vehicle to everything (V2X), vehicle to vehicle (V2V), machine-to-machine/machine-type communication (M2M/MTC), and internet of things (IoT).

Figure 2:
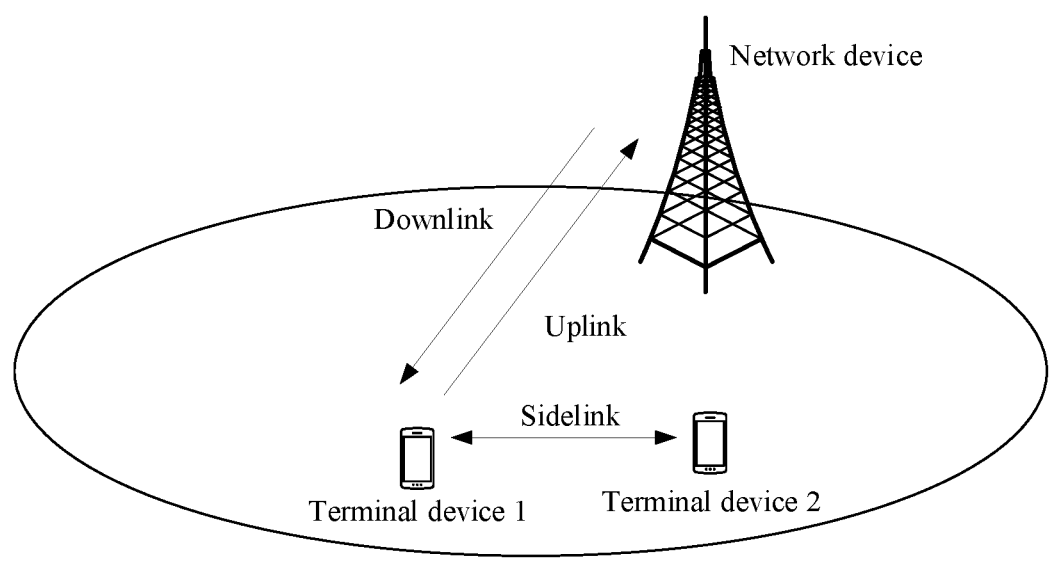
FIG. 2 is a schematic diagram of a network architecture applicable to an embodiment of this application.

For example, FIG. 2 is a schematic diagram of an application scenario applicable to an embodiment of this application. In FIG. 2, a terminal device 1 may directly communicate with a terminal device 2, and the terminal device 1 may further communicate with a network device through the terminal device 2. A link between terminal devices may be referred to as a sidelink. The network device may preconfigure a plurality of resources on the sidelink, and the terminal device may sense an available resource in the plurality of resources and select a resource from the plurality of resources to transmit data.

The network device in FIG. 2 is, for example, an access network device, and the access network device may be, for example, a base station. The access network device corresponds to different devices in different systems. For example, the access network device may correspond to an eNB in the 4G system or may correspond to a gNB in the 5G system. Certainly, technical solutions provided in embodiments of this application may also be applied to a future mobile communication system. Therefore, the access network device in FIG. 2 may also correspond to a network device in the future mobile communication system. In embodiments of this application, an example in which the access network device is a base station is used. Actually, with reference to the foregoing description, the access network device may also be a device such as a roadside unit (RSU).

This application is applicable to a short-distance communication scenario such as SL communication. In the short-distance communication scenario such as SL communication, even if beam energy for sending a reference signal is not concentrated, a signal-to-noise ratio (SNR) is not very low, and an error of measuring the reference signal by the receiving device is not very large, so that accuracy of beam training can be ensured.

A network architecture and a service scenario described in embodiments of this application are intended to describe the technical solutions in embodiments of this application more clearly, and constitute no limitation on the technical solutions provided in embodiments of this application. A person of ordinary skill in the art may know that the technical solutions provided in embodiments of this application are also applicable to similar technical problems with evolution of the network architecture and emergence of new service scenarios.

In this application, interaction between the first device and the second device is used as an example for description. An operation performed by the first device may also be performed by a chip or a module in the first device, and an operation performed by the second device may also be performed by a chip or a module in the second device. The first device may be a network device or a terminal device, and the second device may also be a network device or a terminal device. This is not limited in embodiments of this application. The first device may be the terminal device 1 or 2 in FIG. 2 or the network device in FIG. 2. The second device may be the terminal device 1 or 2 in FIG. 2 or the network device in FIG. 2.

Embodiment 1

Figure 3:
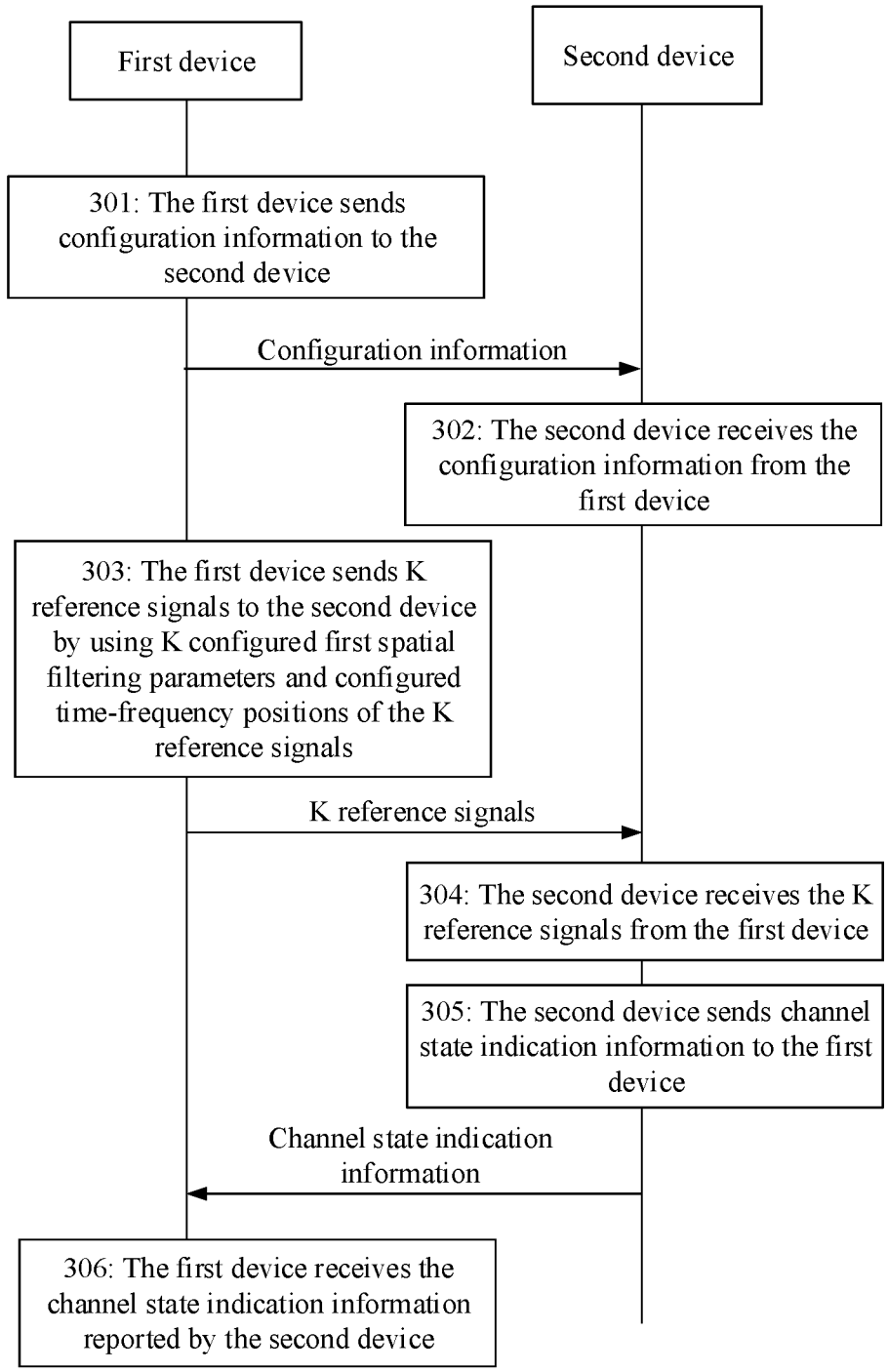
FIG. 3 is a schematic diagram of a flowchart of a communication method according to an embodiment of this application.

With reference to the foregoing descriptions, FIG. 3 is a schematic diagram of a flowchart of a communication method according to an embodiment of this application. Refer to FIG. 3. The method includes the following steps.

S301: A first device sends configuration information to a second device.

S302: The second device receives the configuration information from the first device.

The configuration information may include first information, second information, and third information. The first information is indication information of K reference signals, the second information is indication information of K first spatial filtering parameters corresponding to the K reference signals, the third information is indication information of a channel sparse basis matrix of channels between the first device and the second device, and K is an integer greater than 1. In an implementation, when an antenna array of the second device includes $N_1 N_2$ antennas, K may be less than $N_1 N_2$. $N_1$ and $N_2$ are integers greater than 0.

In this embodiment of this application, the reference signal may be a CSI-RS or a reference signal of another type. This is not limited in this application.

In this embodiment of this application, the first information may include information such as time-frequency position information of the K reference signals and reference signal resource indexes of the K reference signals. The K reference signals are located in different time units. One time unit may be an OFDM symbol in orthogonal frequency division multiplexing (OFDM), a slot in another system, or the like. This is not limited in this embodiment of this application.

In this embodiment of this application, there is a correspondence between one of the K reference signals and one of the K first spatial filtering parameters, and the correspondence is preconfigured. One reference signal corresponds to one first spatial filtering parameter, and different reference signals may correspond to different first spatial filtering parameters. In this embodiment of this application, the first device may send a reference signal by using a first spatial filtering parameter corresponding to the reference signal.

In a possible implementation, the first spatial filtering parameter may be an analog precoding vector. Accordingly, the second information, namely, the indication information of the K first spatial filtering parameters may be indication information of K analog precoding vectors. It is assumed that the K analog precoding vectors are $(m_0, m_1, \ldots, m_{K-1})$, a vector $m_k$ is an analog precoding vector associated with the $k^{th}$ reference signal, and k=0, 1, K−1. A length of the vector $m_k$ is equal to a quantity of antenna elements in an antenna array of the first device. For example, when the antenna array of the first device includes antenna elements of $N_1$ rows and $N_2$ columns, the length of the analog precoding vector $m_k$ is $N_1 \times N_2$. Each element in the analog precoding vector $m_k$ is a complex number, an amplitude of each element is $1/\sqrt{N_1 N_2}$, and a phase of each element corresponds to a phase value of a phase shifter connected to each antenna element. For example, $m_k = 1/\sqrt{N_1 N_2}[1, 1, 1, \ldots 1]$ indicates that the phase value of the phase shifter connected to each antenna element under the analog precoding vector is 0.

In another possible implementation, the second information may include values of the K analog precoding vectors $(m_0, m_1, \ldots, m_{K-1})$, so as to directly indicate the K analog precoding vectors.

In this embodiment of this application, the K analog precoding vectors may form an observation matrix $M=[m_0, m_1, \ldots, m_{K-1}]^H$, where H represents a matrix transpose, and dimensions of the observation matrix M are $K \times N_1 N_2$, that is, K rows and $N_1 N_2$ columns.

In a possible implementation, any two columns in the observation matrix are linearly independent. Certainly, there may also be two linearly dependent columns in the observation matrix. This is not limited in this application.

In this embodiment of this application, there may be a plurality of manners of how to specifically indicate the K analog precoding vectors. For example, the K analog precoding vectors may be indicated by using the following manner: Both the first device and the second device store a predefined random analog precoding codebook. K analog precoding vectors configured by the first device for the second device correspond to K rows or K columns of the random analog precoding codebook. The first device sends indexes of the K rows or K columns to the second device, to indicate the K analog precoding vectors. In other words, in this manner, the second information may include K row indexes or column indexes in the analog precoding codebook. Correspondingly, the K first spatial filtering parameters are the K analog precoding vectors indicated by the K row indexes or column indexes in the analog precoding codebook, and the predefined analog precoding codebook is preconfigured or configured by default.

In this embodiment of this application, the third information is the indication information of the channel sparse basis matrix of the channels between the first device and the second device. Because a millimeter wave channel generally presents a sparseness characteristic only in angle domain, an angle domain channel needs to be transformed back to a common spatial domain channel by using a channel sparse basis matrix after the channel is processed by using the channel sparseness characteristic in angle domain. Specifically, the channel sparse basis matrix is determined based on a discrete Fourier transform (DFT) matrix corresponding to the antenna array size of the first device. When the antenna array of the first device is a uniform linear array, the channel sparse basis matrix is a first discrete Fourier transform matrix, and a quantity of rows/columns of the first discrete Fourier transform matrix is the same as a quantity of elements of the uniform linear array. When the antenna array of the first device is a uniform planar array, the channel sparse basis matrix is a Kronecker product of a second discrete Fourier transform matrix and a third discrete Fourier transform matrix or a Kronecker product of the third discrete Fourier transform matrix and the second discrete Fourier transform matrix. A quantity of rows/columns of the second discrete Fourier transform matrix and a quantity of rows/columns of the third discrete Fourier transform matrix respectively are the same as a quantity of antenna elements of the uniform planar array in two dimensions.

For example, when the antenna array size of the first device is $N_1$ rows and $N_2$ columns, the channel sparse basis matrix D may be in the following form:

$$D = U_{N_1} \otimes U_{N_2} \quad (1)$$

An $N_1 \times N_1$-dimensional matrix $U_{N_1}$ indicates a DFT matrix whose length is $N_1$. An $N_2 \times N_2$-dimensional matrix $U_{N_2}$ indicates a DFT matrix whose length is $N_2$. $\otimes$ indicates a Kronecker product. The channel h between the first device and the second device can be written in a form of h=Dx. h is a vector whose length is $N_1N_2$, indicating a channel from each antenna element of the first device to a receiving device. The $[(i-1)N_2+j]^{th}$ element in h indicates a channel from the antenna element in the it h row and the it h column to the receiving device. A vector x is a sparse vector whose length is $N_1N_2$, indicating an angle domain channel after DFT. Because a millimeter wave channel is sparse in angle domain, x has a small quantity of non-zero elements and is a sparse vector.

Similarly, the channel sparse basis matrix D may alternatively be in the following form:

$$D = U_{N_2} \otimes U_{N_1} \quad (2)$$

In this case, it may still be considered that the channel h may satisfy h=Dx. However, a correspondence between an element in each position of the channel h and an antenna element is different from the foregoing. The $[(j-1)N_1+i]^{th}$ element in h represents an equivalent channel from the antenna element in the $i^{th}$ row and the $j^{th}$ column to the receiving device. x is a sparse vector expression of the corresponding channel h in angle domain.

In this embodiment of this application, the third information may directly or indirectly indicate the channel sparse basis matrix. When the third information directly indicates the channel sparse basis matrix, the third information may directly indicate a value of each element in the channel sparse basis matrix in an agreed order. When the third information indirectly indicates the channel sparse basis matrix, the channel sparse basis matrix D may be indicated by using the following manner: The third information includes information of the antenna array size of the first device. That is, the first device sends the antenna array size $(N_1, N_2)$ of the first device to the second device. Based on $(N_1, N_2)$ and formula (1) or (2), the second device determines the sparse basis matrix D. $(N_1, N_2)$ indicates that the antenna array size is $N_1$ rows and $N_2$ columns.

In another implementation, in this embodiment of this application, the second device finally needs to obtain a matrix product of the observation matrix M and the channel sparse basis matrix D, that is, a matrix MD. Therefore, the first device may also jointly indicate the observation matrix M and the channel sparse basis matrix D, that is, directly indicate the matrix MD and do not separately indicate the two.

In this embodiment of this application, the configuration information may further include indication information of K PTRSs. The indication information of the K PTRSs may be referred to as fourth information. The fourth information may indicate information such as time-frequency position information of the K PTRSs and/or reference signal resource indexes of the K PTRSs. One of the K PTRSs and one of the K reference signals are transmitted in a same time unit, and different reference signals are transmitted in different time units.

Figure 4:
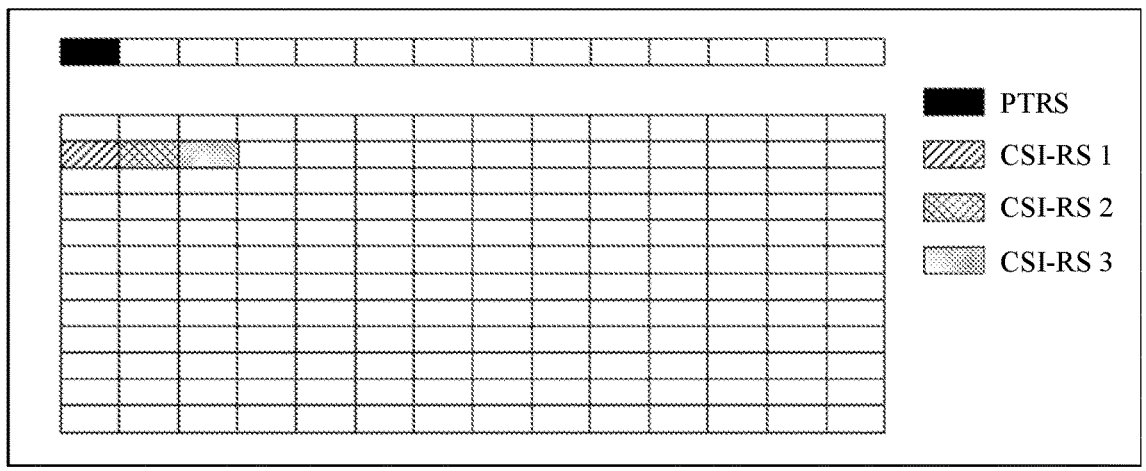
FIG. 4 is a schematic diagram of a reference signal according to an embodiment of this application.

For example, it is assumed that the reference signal is the CSI-RS, and the K PTRSs are associated with K CSI-RSs. An association relationship between the K PTRSs and the K CSI-RSs is that for any CSI-RS, one PTRS is in a same symbol as the CSI-RS. As shown in FIG. 4, it is assumed that there are a CSI-RS 1 to a CSI-RS 3, and the CSI-RS 1 to the CSI-RS 3 are respectively sent on a symbol 1 to a symbol 3. In a symbol in which each CSI-RS is located, one PTRS is further sent.

The first device may configure the PTRS for the second device to suppress impact of phase noise on different symbols when the following condition is met: The first device has a plurality of transmit channels, and at least two of the plurality of transmit channels share a crystal oscillator. This is because phase noise is mainly caused by an undesirable crystal oscillator. When two transmit channels share a crystal oscillator, signals sent by the two channels experience same phase noise. Therefore, the PTRS can be sent on one of the transmit channels to correct a phase of the CSI-RS on the other channel.

It should be noted that the K phase tracking reference signals may be sent by using a same spatial filtering parameter. In other words, the K phase tracking reference signals may correspond to the same spatial filtering parameter. The same spatial filtering parameter corresponding to the K phase tracking reference signals may be one of the K first spatial filtering parameters. Alternatively, the same spatial filtering parameter corresponding to the K phase tracking reference signals may be a spatial filtering parameter different from the K first spatial filtering parameters, that is, not be any one of the K first spatial filtering parameters. When the K phase tracking reference signals are sent by using the same spatial filtering parameter, in a case in which a channel is stable, a phase change on the PTRS received by the receiving device is caused only by phase noise. Because the K reference signals are sent by using K different first spatial filtering parameters, a phase change of the K reference signals is caused by both the channel and phase noise. A phase of the reference signal is corrected by using the received PTRS, and only phase information caused by the channel in the received reference signal may be retained. In this way, subsequent channel estimation and beam training can be more accurate.

In this embodiment of this application, the configuration information may further include fifth information, and the fifth information is used to indicate a plurality of second spatial filtering parameters. The second spatial filtering parameter may also be referred to as an available spatial filtering parameter of the first device. The plurality of second spatial filtering parameters may be located in an available spatial filtering parameter set.

In a possible implementation, the fifth information may directly indicate the plurality of second spatial filtering parameters. Specifically, the fifth information may directly indicate a plurality of candidate analog precoding vectors corresponding to the plurality of second spatial filtering parameters.

In a possible implementation, the fifth information may indirectly indicate the plurality of second spatial filtering parameters. For example, the fifth information indicates an available analog precoding matrix determined based on an available spatial filtering parameter set. The available spatial filtering parameter set may be an available analog precoding matrix including an analog precoding vector set. For example, the available analog precoding matrix may be an oversampled DFT matrix obtained based on $(N_1, N_2)$ and an oversampling factor $(O_1, O_2)$. The DFT matrix may also be referred to as an available beamforming matrix, and the DFT matrix S may meet the following form:

$$S = V_{N_1}^{O_1} \otimes V_{N_2}^{O_2} \quad (3)$$

$V_{N_1}^{O_1}$ is an $O_1 N_1 \times N_1$-dimensional matrix, indicating an $N_1$-dimensional DFT matrix under $O_1$-times oversampling. $V_{N_2}^{O_2}$ is an $O_2 N_2 \times N_2$-dimensional matrix, indicating an $N_2$-dimensional DFT matrix under $O_2$-times oversampling. The $N_1$-dimensional DFT matrix $V_{N_1}^{O_1}$ and the $N_2$-dimensional DFT matrix $V_{N_2}^{O_2}$ may respectively meet the following forms:

$$V_{N_1}^{O_1} = \begin{bmatrix} 1 & 1 & 1 & \cdots & 1 \\ 1 & e^{j2\pi/O_1 N_1} & e^{j4\pi/O_1 N_1} & \cdots & e^{j2\pi(N_1-1)/O_1 N_1} \\ \vdots & \vdots & \vdots & \ddots & \vdots \\ 1 & e^{j2\pi(O_1 N_1-1)/O_1 N_1} & e^{j4\pi(O_1 N_1-1)/O_1 N_1} & \cdots & e^{j2\pi(O_1 N_1-1)(N_1-1)/O_1 N_1} \end{bmatrix}$$

$$V_{N_2}^{O_2} = \begin{bmatrix} 1 & 1 & 1 & \cdots & 1 \\ 1 & e^{j2\pi/O_2 N_2} & e^{j4\pi/O_2 N_2} & \cdots & e^{j2\pi(N_2-1)/O_2 N_2} \\ \vdots & \vdots & \vdots & \ddots & \vdots \\ 1 & e^{j2\pi(O_2 N_2-1)/O_2 N_2} & e^{j4\pi(O_2 N_2-1)/O_2 N_2} & \cdots & e^{j2\pi(O_2 N_2-1)(N_2-1)/O_2 N_2} \end{bmatrix}$$

j is a unit of an imaginary number.

Similarly, the beamforming matrix S may also meet the following form:

$$S = V_{N_2}^{O_2} \otimes V_{N_1}^{O_1} \quad (4)$$

Available beamforming matrices in formulas (3) and (4) correspond to the foregoing different channel expressions, that is, the channel sparse basis matrix D shown in formula (1) corresponds to the available beamforming matrix shown in formula (3), and the channel sparse basis matrix D shown in formula (2) corresponds to the available beamforming matrix shown in formula (4).

In this embodiment of this application, the available beamforming matrix may also be indicated in the following manner: The first device sends the antenna array size $(N_1, N_2)$ of the first device and the oversampling factor $(O_1, O_2)$ to the second device, and the second device determines the available beamforming matrix S based on and the formula (3) or (4).

S303: The first device sends a reference signal to the second device.

Specifically, the first device may send K reference signals to the second device. The first device may send the K reference signals to the second device by using the K configured first spatial filtering parameters and configured time-frequency positions of the K reference signals.

For example, the first device uses a first transmit channel to send the K reference signals at the time-frequency positions that correspond to the K reference signals and are configured in S301. A first spatial filtering parameter used by the first device for sending the $k^{th}$ reference signal is consistent with the $k^{th}$ first spatial filtering parameter configured in S301. For example, when the $k^{th}$ reference signal is sent, an analog precoding vector used by each antenna element is the $k^{th}$ analog precoding vector configured in S301.

Optionally, if the first device further configures the PTRS in S301, the first device uses a second transmit channel that shares a crystal oscillator with the first transmit channel to send the K PTRSs at time-frequency positions that correspond to the K PTRSs and are configured in S301. It should be noted that a spatial filtering parameter used for sending the K PTRSs by using the second transmit channel is a fixed spatial filtering parameter, that is, the K PTRSs may be sent by using the same spatial filtering parameter. For example, an analog precoding vector used for sending the K PTRSs by using the second transmit channel is a fixed analog precoding vector.

S304: The second device receives the K reference signals from the first device.

Optionally, when the first device further configures the PTRS, the first device sends the K PTRSs at the time-frequency positions of the K configured PTRSs by using a spatial filtering parameter, and the second device receives the K PTRSs from the first device.

The second device receives and measures the K CSI-RSs at the time-frequency positions that are associated with the K reference signals and configured by the first device. After normalization is performed based on a predefined baseband signal, the obtained received reference signal is:

$$y = [y_0, y_1, \ldots, y_{K-1}]^H$$

$y_k$ indicates a received measurement value of the $k^{th}$ reference signal, and $k = 0, 1, \ldots, K-1$.

Optionally, if the first device further configures the PTRS for the second device, the second device may further perform phase correction on a phase of the received CSI-RS based on the received PTRS. In other words, the second device may calibrate phases of K received measurement values of the K reference signals based on measurement values of the K PTRSs. A specific correction process is not limited in this application, and details are not described herein again.

Based on the K received measurement values of the K received reference signals, the K first spatial filtering parameters, and the channel sparse basis matrix D, the second device may estimate a channel to obtain an estimation value $\hat{h}$ of the channel. The estimation value of the channel is an estimation value obtained by quantizing an amplitude and a phase of an element in a matrix corresponding to the channel, and the estimation value $\hat{h}$ of the channel is a vector including a plurality of elements.

Specifically, an estimation value $\hat{x}$ of an angle domain channel may be determined based on the K received measurement values of the K reference signals, the K first spatial filtering parameters, and the channel sparse basis matrix, and then the estimation value $\hat{h}$ of the channel is determined based on the estimation value of the angle domain channel.

For example, the observation matrix M including K beamforming vectors and the channel sparse basis matrix D are configured for the first device. In this case, estimating the angle domain channel by the second device is equivalent to resolving the following formula:

$$\hat{x} = \min_{x}|x|_0 \text{ s.t. } |y - MDx|^2 \leq \epsilon \tag{5}$$

$\epsilon$ is a preset value, and the preset value may be a difference allowed between a received signal y and an estimated received signal MDx, and may be configured by default or configured by the first device. s.t.$|y-MDx|2\leq\epsilon$ indicates that $$\hat{x} = \min_{x}|x|0$$

is limited by a condition $|y-MDx|2\leq\epsilon$. $\hat{x}$ indicates the estimation value of the angle domain channel and is a vector including a plurality of elements. x is a sparse vector expression of the corresponding channel h in angle domain.

The second device may resolve the foregoing problem by using a conventional compressive sensing recovery algorithm, for example, a matching pursuit (MP) algorithm, an orthogonal matching pursuit (OMP) algorithm, or an approximate message passing (AMP) algorithm. A specific algorithm used by the second device is not limited in this application. After the second device obtains the estimation value $\hat{x}$ of the sparse vector of the channel in angle domain based on formula (5), the estimation value $\hat{h}=D\hat{x}$ of the channel can be obtained.

In this embodiment of this application, after obtaining the estimation value of the channel, the second device may send channel state indication information to the first device.

S305: The second device sends the channel state indication information to the first device.

S306: The first device receives the channel state indicator information reported by the second device.

The channel state indication information is determined based on the K received measurement values of the K reference signals, the K first spatial filtering parameters, and the channel sparse basis matrix.

In a first possible implementation, if the first device configures an available spatial filtering parameter set of the first device for the second device, the available spatial filtering parameter set includes the plurality of second spatial filtering parameters indicated by the fifth information. In this implementation, the channel state indication information may have at least the following two cases:

Case 1: The channel state indication information may include at least one second spatial filtering parameter or an index of the at least one second spatial filtering parameter in the plurality of second spatial filtering parameters.

Case 2: The channel state indication information includes at least one second spatial filtering parameter or an index of the at least one second spatial filtering parameter in the plurality of second spatial filtering parameters, and a quantized channel gain value corresponding to the at least one second spatial filtering parameter.

The at least one second spatial filtering parameter is one of the plurality of second spatial filtering parameters indicated by the fifth information. The quantized channel gain value corresponding to the at least one second spatial filtering parameter is determined based on the K received measurement values of the K reference signals, the K spatial filtering parameters, and the channel sparse basis matrix.

Specifically, the second device can determine at least one optimal spatial filtering parameter based on the estimation value of the channel and the available spatial filtering parameter set. For example, a plurality of second spatial filtering parameters configured by the first device for the second device may form an available beamforming matrix S. In this case, the second device obtains an equivalent channel gain estimation value c=S$\hat{h}$ corresponding to each available beamforming vector. The second device determines at least one element whose element amplitude value is the largest from c, so that at least one second spatial filtering parameter corresponding to the at least one element whose element amplitude value is the largest is indicated by using the channel state indication information. The second device may report an index corresponding to the at least one element whose element amplitude value is the largest in c. Optionally, the second device may further report an amplitude of the at least one element whose element amplitude value is the largest in c.

In this implementation, after obtaining the channel state indication information, the first device may determine at least one second spatial filtering parameter based on the channel state indication information. Because each second spatial filtering parameter may correspond to one beam direction, that is, correspond to one data transmission direction, the first device may use at least one beam direction corresponding to the at least one second spatial filtering parameter as a beam direction for data transmission.

In a second possible implementation, the channel state indication information includes at least one of a quantized value of the estimation value $\hat{h}$ of the channel and a quantized value of the estimation value $\hat{x}$ of the angle domain channel.

The quantized value of the estimation value $\hat{h}$ of the channel may include quantization of an amplitude value and an angle value or quantization of a real part and an imaginary part of each element in the estimation value $\hat{h}$ of the channel. For example, the quantized value of the estimation value $\hat{h}$ of the channel may include a value obtained by quantizing an amplitude and a phase of at least one element in the estimation value $\hat{h}$ of the channel, or include a value obtained by quantizing a real part and an imaginary part of at least one element in the estimation value $\hat{h}$ of the channel.

The quantized value of the estimation value $\hat{x}$ of the angle domain channel may include quantization of an amplitude value and an angle value or quantization of a real part and an imaginary part of each element in the estimation value $\hat{x}$ of the angle domain channel. For example, the quantized value of the estimation value $\hat{x}$ of the angle domain channel may include a value obtained by quantizing an amplitude and a phase of at least one element in the estimation value $\hat{x}$ of the angle domain channel, or include a value obtained by quantizing a real part and an imaginary part of at least one element in the estimation value $\hat{x}$ of the angle domain channel. Optionally, the quantized value of the estimation value $\hat{x}$ of the angle domain channel may further include an index of the at least one element of the estimation value $\hat{x}$ of the angle domain channel in the estimation value $\hat{x}$ of the angle domain channel.

Optionally, the at least one element in the estimation value $\hat{x}$ of the angle domain channel may be an element with the largest amplitude in the estimation value $\hat{x}$ of the angle domain channel. A quantity of reported elements in the estimation value $\hat{x}$ of the angle domain channel may be predefined or configured by the first device.

In the first implementation, after obtaining the channel state indication information, the first device may obtain the estimation value $\hat{h}$ of the channel or the estimation value $\hat{x}$ of the angle domain channel. Because the first device can determine a plurality of available second spatial filtering parameters of the first device, that is, the beamforming matrix S, the first device may obtain an equivalent channel gain estimation value $c=S\hat{h}$ in each available beamforming vector, and the second device determines, from c, at least one element with the largest amplitude. The first device may determine, from the plurality of second spatial filtering parameters, at least one second spatial filtering parameter corresponding to the at least one element whose element amplitude value is the largest. Then, the first device may use at least one beam direction corresponding to the at least one second spatial filtering parameter as a beam direction for data transmission.

It should be noted that an essential process of beam training is a process of measuring a channel at various angles. When there is no prior information on the channel, a lossless beam measurement result can be obtained only after all beams are measured, and consumed time is relatively long. However, a millimeter wave channel is sparse in angle domain, that is, a path between a receiving device and a sending device appears only in a particular angle direction. Based on this assumption, in this application, a few measurements (corresponding to an observation or sampling concept in compressive sensing) are performed on a sparse angle-domain millimeter wave channel, and an observation matrix is constituted by using a plurality of measurements, so that the channel can be restored with relatively high accuracy. Mathematically, the observation matrix needs to meet linearly independent of any two columns to ensure relatively good restoration performance. In this application, some precoding vector codebooks need to be predefined to meet the condition.

In addition, as described above, the millimeter wave channel reflects the sparseness characteristic only in angle domain. Therefore, in this application, the channel needs to be estimated in angle domain. However, in an actual case, the channel can be measured only in spatial domain (namely, a received signal value on each antenna). Therefore, in this application, a sparse basis matrix needs to be used to transform the angle domain channel to spatial domain. Then, an estimated spatial domain channel is compared with an actually received signal. In addition, when restoring the sparse angle domain channel, the receiving device needs to use specific values of the observation matrix and the sparse basis matrix. Therefore, related information needs to be configured for the receiving device.

According to the method provided in this embodiment of this application, a beam training mechanism based on reference signal reporting is proposed. In addition to a configuration of the reference signal, the configuration information further includes the indication information of the spatial filtering parameter used by a sending device (that is, the first device) for sending the reference signal, the indication information of the channel sparse basis matrix, and indication information of an available spatial filtering parameter set of the sending device. Based on the method, the sending device sends a small quantity of reference signals, and a receiving device (that is, the second device) can complete channel estimation based on the configuration information and the compressive sensing recovery algorithm, and then determines an optimal transmit beam based on the estimated channel, thereby reducing reference signal overheads and time overheads for beam training. For example, when an antenna array of the sending device includes $N_1 N_2$ antennas and a quantity of available transmit beamforming vectors of the sending device is $N_1 N_2$, theoretically, the sending device needs to send $N_1 N_2$ reference signals to measure quality of all beams to complete the beam training procedure. However, this solution uses the sparseness characteristic of the millimeter wave channel in angle domain and the compressive sensing algorithm. The sending device needs to send only a small quantity of reference signals to estimate the channel and complete beam training.

This application further proposes a reference signal configuration method and a sending method of joint CSI-RS and PTRS configuration, so as to eliminate phase noise on different symbols in the beam training procedure and improve beam training precision.

Embodiment 2

Figure 5:
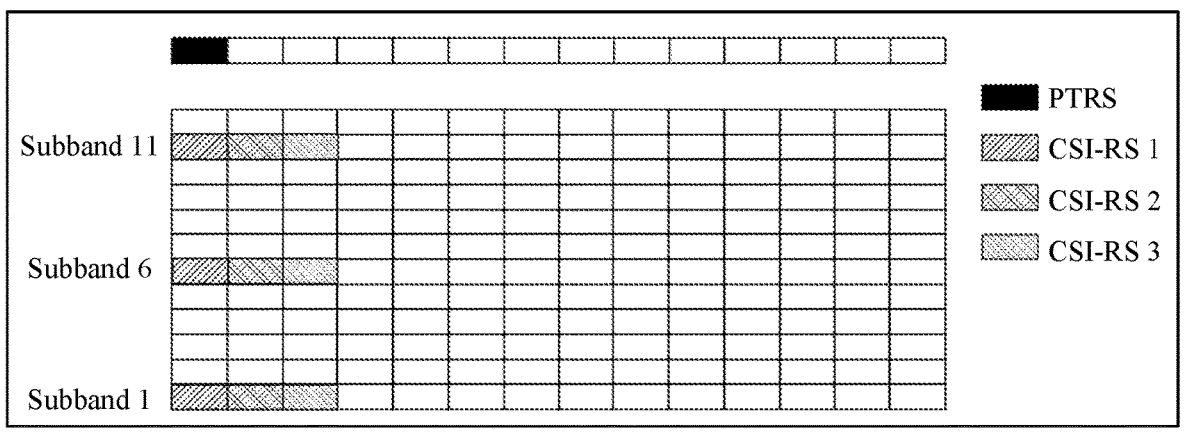
FIG. 5 is a schematic diagram of a reference signal according to an embodiment of this application.

In the foregoing embodiment, a reference signal is carried by using one subband (for example, the subband may be one subcarrier) in frequency domain. This embodiment of this application may be further applied to beam training performed by using a wideband reference signal. The wideband reference signal includes reference signals located in a plurality of subbands in frequency domain, and frequency spacings of any two adjacent subbands in frequency domain are the same. FIG. 5 is a schematic diagram of a wideband reference signal according to an embodiment of this application. As shown in FIG. 5, it is assumed that the reference signal is a CSI-RS. In FIG. 5, three CSI-RSs: a CSI-RS 1 to a CSI-RS 3 are used as an example for description, and the CSI-RSs are sent in a symbol 1 to a symbol 3, respectively. In a symbol in which each CSI-RS is located, one PTRS is further sent. Each CSI-RS includes reference signals located on three subbands, and the three subbands are a subband 1, a subband 6, and a subband 11.

With reference to the foregoing embodiment, an example in which the wideband reference signal is a wideband CSI-RS is used for description.

Step 1: A first device sends configuration information to a second device.

Step 2: The second device receives the configuration information from the first device.

The configuration information includes indication information of K wideband CSI-RSs, indication information of K first spatial filtering parameters corresponding to the K wideband CSI-RSs, and indication information of a channel sparse basis matrix D.

The indication information of the K wideband CSI-RSs may include time-frequency position information of the K wideband CSI-RSs and reference signal resource indexes of the K wideband CSI-RSs. The K wideband CSI-RSs are located in different time units (for example, OFDM symbols), each of the K wideband CSI-RSs includes a plurality of subband CSI-RSs in frequency domain, and frequency spacings of any two adjacent subband CSI-RSs in frequency domain are the same.

Related content of the indication information of the K first spatial filtering parameters and the indication information of the channel sparse basis matrix D is the same as that described in Embodiment 1. For specific content, refer to related descriptions in Embodiment 1. Details are not described herein again.

Optionally, the configuration information sent by the first device to the second device may further include fourth information. The fourth information is indication information of K PTRSs. The indication information of the K PTRSs may include time-frequency position information of the K PTRSs and/or reference signal resource indexes of the K PTRSs. For details, refer to the foregoing descriptions. As shown in FIG. 5, the K PTRSs are associated with the K wideband CSI-RSs, and an association relationship between the K PTRSs and the K wideband CSI-RSs is that for any wideband CSI-RS, one PTRS is in the same symbol as the wideband CSI-RS. The first device may configure the PTRS for the second device to suppress impact of phase noise on different symbols when the following condition is met: The first device has a plurality of transmit channels, and at least two of the plurality of transmit channels share a crystal oscillator.

It should be noted that the K phase tracking reference signals may be sent by using a same spatial filtering parameter. In other words, the K phase tracking reference signals may correspond to the same spatial filtering parameter. When the K phase tracking reference signals are sent by using the same spatial filtering parameter, in a case in which a channel is stable, a phase change on the PTRS received by a receiving device is caused only by phase noise. Because K reference signals are sent by using K different first spatial filtering parameters, a phase change of the K reference signals is caused by both the channel and phase noise. A phase of the reference signal is corrected by using the received PTRS, and only phase information caused by the channel in the received reference signal may be retained. In this way, subsequent channel estimation and beam training can be more accurate.

Optionally, the configuration information sent by the first device to the second device may further include indication information of an available spatial filtering parameter set of the first device, that is, include fifth information indicating a plurality of second spatial filtering parameters. Content related to the fifth information and the indication information of the available spatial filtering parameter set is the same as that in Embodiment 1. For specific content, refer to related descriptions in Embodiment 1. Details are not described herein again.

Step 3: The first device sends a reference signal to the second device.

Specifically, the first device may send the K wideband CSI-RSs to the second device. The first device may send the K wideband CSI-RSs to the second device by using the K configured first spatial filtering parameters and configured time-frequency positions of the K reference signals.

For example, the first device uses a first transmit channel to send the K wideband CSI-RSs at the time-frequency positions that correspond to the K wideband CSI-RSs and are configured in step 1. A first spatial filtering parameter used by the first device for sending the $k^{th}$ wideband CSI-RS is consistent with the $k^{th}$ first spatial filtering parameter configured in step 1. For example, when the $k^{th}$ wideband CSI-RS is sent, an analog precoding vector used by each antenna element is the $k^{th}$ analog precoding vector configured in step 1.

Optionally, if the first device further configures the PTRS in step 1, the first device uses a second transmit channel that shares a crystal oscillator with the first transmit channel to send the K PTRSs at time-frequency positions that correspond to the K PTRSs and configured in step 1. It should be noted that a spatial filtering parameter used for sending the K PTRSs by using the second transmit channel is a fixed spatial filtering parameter, that is, the K PTRSs may be sent by using the same spatial filtering parameter. For example, an analog precoding vector used for sending the K PTRSs by using the second transmit channel is a fixed analog precoding vector.

Step 4: The second device receives the reference signal. Specifically, the second device may receive the K wideband CSI-RSs from the first device.

Optionally, when the first device further configures the PTRS, the first device sends the K PTRSs at the time-frequency positions of the K configured PTRSs by using a spatial filtering parameter, and the second device receives the K PTRSs from the first device.

The second device receives and measures the K wideband CSI-RSs at the time-frequency positions that are associated with the K wideband CSI-RSs and configured by the first device. After normalization is performed based on a predefined baseband signal, the received wideband CSI-RS is $Y=[y_0, y_1, \ldots, y_{F-1}]$. F represents a quantity of subband CSI-RSs included in the wideband CSI-RS, and $y_f=[y_f^0, y_f^1, \ldots, y_f^{K-1}]^H$ represents measurement values of K subband CSI-RS received on the $(f+1)^{th}$ subband. The second device transforms the received reference signal from frequency domain to delay domain, and may obtain:

$$Z = YU_F \quad (6)$$

$Z=[z_0, z_1, \ldots, z_{F-1}]$ is obtained. An F×F-dimensional matrix $U_F$ represents a DFT matrix with a length of F, and $z_f=[z_f^0, z_f^1, \ldots, z_f^{K-1}]^H$ represents a received signal in the $f^{th}$ snapshot in delay domain.

A millimeter wave channel is also sparse in delay domain (delays corresponding to a plurality of different paths are different). Therefore, after the foregoing reference signal is transformed to delay domain, Z is equivalent to jointly observing the channel in angle domain and delay domain, so that the channel is sparser. When a quantity of observation times is specified, the sparser an original signal, the higher recovery precision by using a compressive sensing algorithm. Therefore, channel recovery precision can be improved after the foregoing transformation.

Optionally, if the first device further configures the PTRS for the second device, the second device may further perform phase correction on a phase of the received CSI-RS based on the received PTRS. A specific correction process is not limited in this application, and details are not described herein again.

Channel estimation by the second device is equivalent to resolving the following optimization problem in each delay index f to estimate an estimation value $\hat{x}_f$ of an angle domain channel in the $(f+1)^{th}$ snapshot in delay domain, and the estimation value meets the following form:

$$\hat{x}_f = \min_x |x| \; 0 \; s.t. |z_f - MDx|^2 \leq \epsilon \quad (2)$$

$\epsilon$ is a preset value. For example, the preset value may be a difference allowed between a received signal $z_f$ and an estimated received signal MDx, and may be configured by default or configured by the first device. The second device may use a conventional compressive sensing recovery algorithm to resolve the foregoing problem. After the second device obtains the estimation value $\hat{x}_f$ of a sparse vector of the channel in angle domain in each snapshot by resolving the foregoing problem, an estimation value $\hat{h}_f=D\hat{x}_f$ of the channel in each snapshot can be obtained.

Optionally, the channel is also sparse in delay domain, and a received signal $Z=[z_0, z_1, \ldots, z_{F-1}]$ is also concentrated in a few snapshots. Therefore, the second device may first select, based on the received signal Z, a snapshot index set F including most energy, that is, at least one index f with largest $|z_f|_2^2$. Then, the foregoing optimization problem is resolved only for a snapshot index in F.

Step 5: The second device performs reporting based on the estimated channel and sends channel state indication information to the first device.

The reported channel state indication information includes two implementations. Implementation 1: The second device reports indication information of the estimation value $\hat{h}_f$ of the channel in each snapshot, for example, directly quantizes the estimation value $\hat{x}_f$ of the channel and then reports the estimation value. Quantization includes quantization of an amplitude value and quantization of an angle value of each element in the estimation value $\hat{h}_f$. Optionally, the second device may report only indication information of $\hat{h}_f$ in the snapshot index set F. In this case, the second device may additionally report the snapshot index f corresponding to $\hat{h}_f$.

Specifically, the channel state indication information may include at least one of a quantized value of the estimation value $\hat{h}_f$ of the channel and a quantized value of the estimation value $\hat{x}_f$ of the angle domain channel.

When the channel state indication information includes the quantized value of the estimation value $\hat{h}_f$ of the channel, quantization of an amplitude value and an angle value or quantization of a real part and an imaginary part of each element in the estimation value $\hat{h}_f$ of the channel may be included. For example, the quantized value of the estimation value $\hat{h}_f$ of the channel may include a value obtained by quantizing an amplitude and a phase of at least one element in the estimation value $\hat{h}_f$ of the channel, or include a value obtained by quantizing a real part and an imaginary part of at least one element in the estimation value $\hat{h}_f$ of the channel.

Optionally, a quantity of indexes included in the snapshot index set F may be predefined or configured by a sending device.

When the channel state indication information includes the quantized value of the estimation value $\hat{x}_f$ of the angle domain channel, the second device may also report an estimation value $\hat{x}_f$ of a sparse vector of the channel in angle domain in each snapshot after quantization. When reporting $\hat{x}_f$, the second device may report only quantized amplitude values and quantized phase values of several element values with the largest amplitude. Optionally, a quantity of elements in $\hat{x}_f$ may be predefined or configured by the sending device.

Specifically, the quantized value of the estimation value $\hat{x}_f$ of the angle domain channel may include quantization of an amplitude value and an angle value or quantization of a real part and an imaginary part of each element in the estimation value $\hat{x}_f$ of the angle domain channel. For example, the quantized value of the estimation value $\hat{x}_f$ of the angle domain channel may include a value obtained by quantizing an amplitude and a phase of at least one element in the estimation value $\hat{x}_f$ of the angle domain channel, or include a value obtained by quantizing a real part and an imaginary part of at least one element in the estimation value $\hat{x}_f$ of the angle domain channel. Optionally, the quantized value of the estimation value $\hat{x}$ of the angle domain channel may further include an index of the at least one element of the estimation value $\hat{x}_f$ of the angle domain channel in the estimation value $\hat{x}_f$ of the angle domain channel.

Optionally, the at least one element in the estimation value $\hat{x}_f$ of the angle domain channel may be an element with the largest amplitude in the estimation value $\hat{x}_f$ of the angle domain channel. A quantity of reported elements in the estimation value $\hat{x}_f$ of the angle domain channel may be predefined or configured by the first device.

Optionally, the second device may alternatively report only indication information of $\hat{x}_f$ in the snapshot index set F. In this case, the second device may additionally report the snapshot index f corresponding to $\hat{x}_f$.

Implementation 2: If the first device configures the available spatial filtering parameter set of the first device for the second device, the second device may determine, based on the estimation value of the channel and the available spatial filtering parameter set, at least one optimal second spatial filtering parameter for reporting.

For example, a plurality of second spatial filtering parameters configured by the first device for the second device may constitute an available analog precoding matrix S. In this case, the second device obtains an equivalent channel gain $c_f = S\hat{h}_f$ in each snapshot in each available analog precoding vector, and then adds f of an equivalent channel in each snapshot to obtain a total equivalent channel energy gain in each available analog precoding vector. The total equivalent channel energy gain meets the following form. $c_f^H$ represents a row vector corresponding to $c_f$, and I represents a unit matrix.

$$l = \sum_{f=0}^{F-1} c_f^H I c_f$$

Alternatively, the following form may be met:

$$l = \sum_{f=0}^{F-1} \|c_f\|^2$$

The second device may report an index corresponding to at least one element whose element amplitude value is the largest in l. Optionally, the second device may further report an amplitude of the at least one element whose element amplitude value is the largest in l. Optionally, a quantity of reported element indexes may be predefined or configured by the sending device.

In other words, in this implementation, the channel state indication information may have at least the following two cases:

Case 1: The channel state indication information may include at least one second spatial filtering parameter or an index of the at least one second spatial filtering parameter in the plurality of second spatial filtering parameters.

Case 2: The channel state indication information includes at least one second spatial filtering parameter or an index of the at least one second spatial filtering parameter in the plurality of second spatial filtering parameters, and a quantized channel gain value corresponding to the at least one second spatial filtering parameter.

The at least one second spatial filtering parameter is one of the plurality of second spatial filtering parameters indicated by the fifth information. The quantized channel gain value corresponding to the at least one second spatial filtering parameter is determined based on the K received measurement values of the K reference signals, the K spatial filtering parameters, and the channel sparse basis matrix.

According to the method provided in this application, the wideband reference signal is used to provide additional delay domain information for the beam training procedure. When a channel is estimated after the channel is transformed to delay domain, the channel is sparser in angle domain, thereby improving performance of channel estimation and beam training.

According to the method provided in this application, the beam training mechanism based on reference signal reporting is proposed. In addition to a configuration of the reference signal, the configuration information further includes the indication information of the spatial filtering parameter used by the sending device for sending the reference signal, the indication information of the channel sparse basis matrix, and the indication information of the available spatial filtering parameter set of the sending device. Based on the method, the sending device sends a small quantity of reference signals, and the receiving device can complete channel estimation based on the configuration information and the compressive sensing recovery algorithm, and then determine an optimal transmit beam based on the estimated channel, thereby reducing reference signal overheads and time overheads for beam training.

According to the method provided in this application, the reference signal configuration method and sending method of joint CSI-RS and PTRS configuration are proposed, so that phase noise on different symbols in the beam training procedure can be eliminated, and beam training precision can be improved. This solution is extended to the wideband reference signal and optimized, and performance of channel estimation and beam training is improved by using additional delay domain information.

Solutions provided in this application may be extended to a similar wireless communication system, such as wireless fidelity (Wi-Fi), WiMax, and another cellular system related to the 3rd Generation Partnership Project (3GPP).

There is no clear correspondence between numbers of the foregoing embodiments and numbers of the following embodiments, and the numbers are merely used for ease of description in this part. In a case in which no conflict occurs, the solutions in the foregoing embodiments may be combined for use.

To implement each function of the method provided in the foregoing embodiments of this application, the first device, the second device, or the foregoing communication apparatus may include a hardware structure and/or a software module, and implement each function in a form of the hardware structure, the software module, or a combination of the hardware structure and the software module. Whether a function in the foregoing functions is performed by using the hardware structure, the software module, or both the hardware structure and the software module depends on particular applications and design constraints of the technical solutions.

Module division in embodiments of this application is an example, is merely logical function division, and may be other division in actual implementation. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 6:
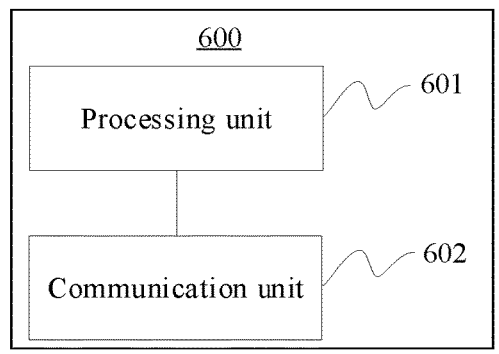
FIG. 6 is a schematic diagram of a structure of a communication apparatus according to an embodiment of this application.

Similar to the foregoing concept, as shown in FIG. 6, an embodiment of this application further provides an apparatus 600. The communication apparatus 600 may be a terminal device 1, a terminal device 2, or a network device in FIG. 2, and is configured to implement the method for the second device in the foregoing method embodiments, or may be configured to implement the method corresponding to the first device in the foregoing method embodiments. For a specific function, refer to descriptions in the foregoing method embodiments.

Specifically, the apparatus 600 may include a processing unit 601 and a communication unit 602. In this embodiment of this application, the communication unit may also be referred to as a transceiver unit, and may include a sending unit and/or a receiving unit, which are respectively configured to perform sending and receiving steps of the first device or the second device in the foregoing method embodiments. The following describes apparatuses provided in embodiments of this application with reference to FIG. 6 and FIG. 7.

In a possible implementation, behavior and a function of the second device in the foregoing method embodiments may be implemented by using the communication apparatus 600, for example, the method performed by the second device in the embodiment shown in FIG. 3. For example, the communication apparatus 600 may be a terminal device, a component (for example, a chip or a circuit) used in the terminal device, a chip or a chip set in the terminal device, or a part of a chip that is configured to perform a related method function. The communication unit 602 may be configured to perform a receiving or sending operation performed by the second device in the embodiment shown in FIG. 3, and the processing unit 601 may be configured to perform an operation other than the receiving or sending operation performed by the second device in the embodiment shown in FIG. 3.

In a possible implementation, the communication unit is configured to: receive configuration information from the first device, where the configuration information includes first information, second information, and third information, the first information is indication information of K reference signals, the second information is indication information of K first spatial filtering parameters corresponding to the K reference signals, the third information is indication information of a channel sparse basis matrix of channels between the first device and the second device, and K is an integer greater than 1; and receive the K reference signals from the first device.

The processing unit is configured to determine channel state indication information based on K received measurement values of the K reference signals, the K first spatial filtering parameters, and the channel sparse basis matrix.

The communication unit is configured to send the channel state indication information to the first device.

In a possible implementation, behavior and a function of the first device in the foregoing method embodiments may be implemented by using the communication apparatus 600, for example, the method performed by the first device in the embodiment shown in FIG. 3. For example, the communication apparatus 600 may be a terminal device, a component (for example, a chip or a circuit) used in the terminal device, a chip or a chip set in the terminal device, or a part of a chip that is configured to perform a related method function. The communication unit 602 may be configured to perform a receiving or sending operation performed by the first device in the embodiment shown in FIG. 3, and the processing unit 601 may be configured to perform an operation other than the receiving or sending operation performed by the first device in the embodiment shown in FIG. 3.

In a possible implementation, the processing unit is configured to: send configuration information to the second device through the communication unit, where the configuration information includes first information, second information, and third information, the first information indicates K reference signals, the second information indicates K first spatial filtering parameters corresponding to the K reference signals, and the third information indicates a channel sparse basis matrix of channels between the first device and the second device; and send the K reference signals to the second device.

The processing unit is configured to receive channel state indication information from the second device through the communication unit, where the channel state indication information is determined based on K received measurement values of the K reference signals, the K first spatial filtering parameters, and the channel sparse basis matrix.

It should be understood that descriptions of apparatus embodiments correspond to descriptions of the method embodiments. Therefore, for content that is not described in detail, refer to the foregoing method embodiments. For brevity, details are not described herein again.

The communication unit may also be referred to as a transceiver device, a transceiver, a transceiver apparatus, or the like. The processing unit may also be referred to as a processor, a processing board, a processing module, a processing apparatus, or the like. Optionally, a component in the communication unit 602 that is configured to implement a receiving function may be referred to as a receiving unit, and a component in the communication unit 602 that is configured to implement a sending function may be referred to as a sending unit. In other words, the communication unit 602 includes the receiving unit and the sending unit. The communication unit may sometimes be referred to as a transceiver, a transceiver device, a transceiver circuit, or the like. The receiving unit may also be sometimes referred to as a receiver, a receiver device, a receiver circuit, or the like. The sending unit sometimes may also be referred to as a transmitter, a transmitter device, a transmitter circuit, or the like.

The foregoing is merely an example. The processing unit 601 and the communication unit 602 may further perform other functions. For more detailed descriptions, refer to related descriptions in the method embodiment shown in FIG. 3. Details are not described herein again.

Figure 7:
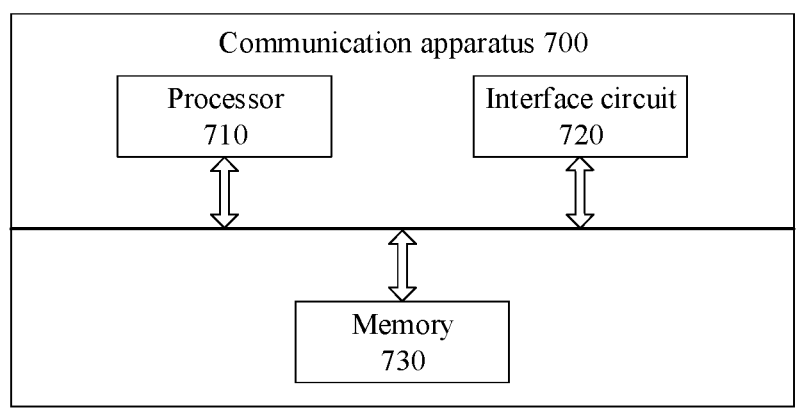
FIG. 7 is a schematic diagram of a structure of a communication apparatus according to an embodiment of this application.

FIG. 7 shows an apparatus 700 according to an embodiment of this application. The apparatus shown in FIG. 7 may be an implementation of a hardware circuit of the apparatus shown in FIG. 6. The communication apparatus is applicable to the flowchart shown above, and performs functions of the first device or the second device in the foregoing method embodiments. For ease of description, FIG. 7 merely shows main components of the communication apparatus.

As shown in FIG. 7, the communication apparatus 700 includes a processor 710 and an interface circuit 720. The processor 710 and the interface circuit 720 are coupled to each other. It may be understood that the interface circuit 720 may be a transceiver or an input/output interface. Optionally, the communication apparatus 700 may further include a memory 730, configured to store instructions executed by the processor 710, input data required by the processor 710 to run the instructions, or data generated after the processor 710 runs the instructions.

When the communication apparatus 700 is configured to implement the method shown in FIG. 3, the processor 710 is configured to implement a function of the processing unit 601, and the interface circuit 720 is configured to implement a function of the communication unit 602.

When the communication apparatus is a chip applied to a terminal device, the chip in the terminal device implements a function of the terminal device in the foregoing method embodiments. The chip in the terminal device receives information from another module (for example, a radio frequency module or an antenna) in the terminal device, where the information is sent by an access network device to the terminal device. Alternatively, the chip in the terminal device sends information to another module (for example, a radio frequency module or an antenna) in the terminal device, where the information is sent by the terminal device to an access network device.

When the communication apparatus is a chip used in an access network device, the chip in the access network device implements a function of the network device in the foregoing method embodiments. The chip in the access network device receives information from another module (for example, a radio frequency module or an antenna) in the access network device, where the information is sent by the terminal device to the access network device. Alternatively, the chip in the access network device sends information to another module (for example, a radio frequency module or an antenna) in the access network device, where the information is sent by the access network device to the terminal device.

According to an embodiment of this application, a network device is provided. The network device has a function of implementing behavior of the network device in any one of the foregoing method embodiments. The function may be implemented by hardware, or may be implemented by hardware executing corresponding software. The hardware or the software includes one or more modules corresponding to each sub-function in the function. The network device may be a core network device, or the network device may be a third-party service device.

According to an embodiment of this application, a terminal device is provided. The terminal device has a function of implementing behavior of the terminal device in any one of the foregoing method embodiments. The function may be implemented by hardware, or may be implemented by hardware executing corresponding software. The hardware or the software includes one or more modules corresponding to each sub-function in the function. Optionally, the terminal device may be user equipment (a mobile phone, a tablet computer, a portable computer, a smart wearable device, an intelligent car, Tx UE, Rx UE, or the like).

According to an embodiment of this application, a communication system is provided. The system includes the first device and the second device in any one of the foregoing embodiments.

According to an embodiment of this application, a computer-readable storage medium is provided. The computer-readable storage medium stores a computer program. When the computer program is executed by a computer, a method process related to the first device in any one of the foregoing method embodiments is implemented. Specifically, the computer may be the foregoing first device.

According to an embodiment of this application, a computer-readable storage medium is provided. The computer-readable storage medium stores a computer program. When the computer program is executed by a computer, a method process related to the second device in any one of the foregoing method embodiments is implemented. Specifically, the computer may be the foregoing second device.

According to an embodiment of this application, a computer program or a computer program product including the computer program is provided. When the computer program is executed by a specific computer, the computer is enabled to implement a method process related to the first device in any one of the foregoing method embodiments. Specifically, the computer may be the foregoing first device.

According to an embodiment of this application, a computer program or a computer program product including the computer program is provided. When the computer program is executed by a specific computer, the computer is enabled to implement a method process related to the second device in any one of the foregoing method embodiments. Specifically, the computer may be the foregoing second device.

According to an embodiment of this application, a chip is further provided. The chip includes a processing module and a communication interface. The processing module can perform a method process related to the first device in any one of the foregoing method embodiments. Further, the chip further includes a storage module (for example, a memory). The storage module is configured to store instructions. The processing module is configured to execute the instructions stored in the storage module. In addition, due to execution of the instructions stored in the storage module, the processing module is enabled to execute a method process related to the first device in any one of the foregoing method embodiments.

According to an embodiment of this application, a chip is further provided. The chip includes a processing module and a communication interface. The processing module can perform a method process related to the first device in any one of the foregoing method embodiments. Further, the chip further includes a storage module (for example, a memory). The storage module is configured to store instructions. The processing module is configured to execute the instructions stored in the storage module. In addition, due to execution of the instructions stored in the storage module, the processing module is enabled to execute a method process related to the second device in any one of the foregoing method embodiments.

It should be understood that the processor in embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor, or the like.

It may be understood that the memory mentioned in embodiments of this application may be a volatile memory or a non-volatile memory, or may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external high-speed cache. By way of an example description but not a limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that the memory described herein is intended to include but not limited to these memories and any memory of another appropriate type.

It should be understood that "first", "second", and various serial numbers in this specification are merely for purpose of distinction for ease of description, but are not intended to limit the scope of this application.

It should be understood that the term "and/or" in this specification describes only an association relationship between associated objects and indicates that three relationships may exist. For example, A and/or B may represent the following three cases: Only A exists, both A and B exist, and only B exists. In addition, the character "/" in this specification usually indicates an "or" relationship between associated objects.

It should be understood that sequence numbers of the foregoing processes in various embodiments of this application do not mean execution sequences. Some or all of the steps may be performed in parallel or in sequence. The execution sequences of the processes should be determined based on functions and internal logic of the processes, and should not be construed as any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A skilled person may use different methods for particular applications to implement the described functions, but this implementation should not be considered as beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, a terminal device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

Cross reference may be performed between related parts between the method embodiments of this application. Apparatuses provided in the apparatus embodiments are configured to perform the methods provided in corresponding method embodiments. Therefore, the apparatus embodiments may be understood with reference to related parts in the related method embodiments.

The structural diagrams of the apparatuses provided in the apparatus embodiments of this application show only simplified designs of corresponding apparatuses. In actual application, the apparatus may include any quantity of transmitters, receivers, processors, memories, and the like, to implement functions or operations performed by the apparatuses in the apparatus embodiments of this application.

Names of messages/frames/indication information, modules, units, or the like provided in embodiments of this application are merely examples, and other names may be used provided that the messages/frames/indication information, modules, units, or the like have same functions.

Terms used in embodiments of this application are merely for the purpose of describing specific embodiments, but are not intended to limit this application. The terms "a", "said" and "the" of singular forms used in embodiments and the appended claims of this application are also intended to include plural forms, unless otherwise specified in the context clearly. It should also be understood that the term "and/or" used herein indicates and includes any or all possible combinations of one or more associated listed items. The character "/" in this specification usually indicates an "or" relationship between associated objects.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art should understand that all or some of the steps of the methods in the foregoing embodiments may be implemented by a program instructing related hardware. The program may be stored in a readable storage medium, in a device, such as a flash memory or an EEPROM. When the program runs, the program executes all or part of the steps described above.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method applied to a second device, the method comprising:
   receiving configuration information from a first device, wherein the configuration information comprises first information, second information, and third information, the first information is indication information of K reference signals, the second information is indication information of K first spatial filtering parameters associated with the K reference signals, the third information is indication information of a channel sparse basis matrix of channels between the first device and the second device, and K is an integer greater than 1;
   receiving the K reference signals from the first device; and
   sending channel state indication information to the first device, wherein the channel state indication information is determined based on K received measurement values of the K reference signals, the K first spatial filtering parameters, and the channel sparse basis matrix.

2. The method of claim 1, wherein there is a correspondence between one of the K reference signals and one of the K first spatial filtering parameters.

3. The method of claim 2, wherein the second information comprises K row indexes or column indexes in an analog precoding codebook;
   the K row indexes or column indexes indicate K analog precoding vectors in the analog precoding codebook; and
   the K first spatial filtering parameters are the K analog precoding vectors indicated by the second information, and the analog precoding codebook is preconfigured or configured by default.

4. The method of claim 1, wherein the third information comprises an antenna array size of the first device, and the channel sparse basis matrix is determined based on a discrete Fourier transform matrix associated with the antenna array size of the first device.

5. The method of claim 1, wherein the configuration information further comprises fourth information, the fourth information is indication information of K phase tracking reference signals, and one of the K phase tracking reference signals and one of the K reference signals are transmitted in a same time unit.

6. The method of claim 5, further comprising receiving the K phase tracking reference signals from the first device, wherein the K phase tracking reference signals are sent by using a same spatial filtering parameter; and
   the spatial filtering parameter is one of the K first spatial filtering parameters;
   or
   the spatial filtering parameter is a spatial filtering parameter different from the K first spatial filtering parameters.

7. The method of claim 1, wherein the channel state indication information comprises a quantized value of an estimation value of an angle domain channel,
   wherein the estimation value of the angle domain channel is determined based on the K received measurement values of the K reference signals, the K first spatial filtering parameters, and the channel sparse basis matrix, and
   wherein the quantized value of the estimation value of the angle domain channel comprises a value obtained by quantizing an amplitude and a phase of at least one element in the estimation value of the angle domain channel, or comprises a value obtained by quantizing a real part and an imaginary part of at least one element in the estimation value of the angle domain channel;
   or the channel state indication information comprises a quantized value of an estimation value of a channel,
wherein the estimation value of the channel is determined based on the K received measurement values of the K reference signals, the K first spatial filtering parameters, and
wherein the channel sparse basis matrix, and the quantized value of the estimation value of the channel comprises a value obtained by quantizing an amplitude and a phase of at least one element in the estimation value of the channel; or comprises a value obtained by quantizing a real part and an imaginary part of at least one element in the estimation value of the channel.

8. The method of claim 7, wherein the channel state indication information further comprises at least one of the following information: an index of the at least one element of the estimation value of the angle domain channel in the estimation value of the angle domain channel, or a snapshot index of the channel.

9. The method of claim 7, wherein the estimation value $\hat{x}$ of the angle domain channel satisfies the following:

$$\hat{x} = \min_{x} |x|_0 \text{ s.t. } |y - MDx|^2 \leq \epsilon,$$

wherein
y is a received signal, M is a matrix comprising the K first spatial filtering parameters, D is the channel sparse basis matrix of the channels between the first device and the second device that is indicated by the third information, and $\epsilon$ is a preset value.

10. The method of claim 1, wherein the configuration information further comprises fifth information, and the fifth information indicates a plurality of second spatial filtering parameters.

11. The method of claim 10, wherein
the channel state indication information comprises at least one second spatial filtering parameter in the plurality of second spatial filtering parameters or an index of the at least one second spatial filtering parameter in the plurality of second spatial filtering parameters;
or
the channel state indication information comprises at least one second spatial filtering parameter in the plurality of second spatial filtering parameters or an index of the at least one second spatial filtering parameter in the plurality of second spatial filtering parameters, and a quantized channel gain value associated with the at least one second spatial filtering parameter; and
the at least one second spatial filtering parameter and the quantized channel gain value associated with the at least one second spatial filtering parameter are determined based on the K received measurement values of the K reference signals, the K first spatial filtering parameters, and the channel sparse basis matrix.

12. A communication method applied to a first device, the method comprising:
sending configuration information to a second device, wherein the configuration information comprises first information, second information, and third information, the first information indicates K reference signals, the second information indicates K first spatial filtering parameters associated with the K reference signals, and the third information indicates a channel sparse basis matrix of channels between the first device and the second device;
sending the K reference signals to the second device; and
receiving channel state indication information from the second device, wherein the channel state indication information is determined based on K received measurement values of the K reference signals, the K first spatial filtering parameters, and the channel sparse basis matrix.

13. The method of claim 12, wherein the channel state indication information comprises a quantized value of an estimation value of an angle domain channel,
wherein the estimation value of the angle domain channel is determined based on the K received measurement values of the K reference signals, the K first spatial filtering parameters, and the channel sparse basis matrix, and
wherein the quantized value of the estimation value of the angle domain channel comprises a value obtained by quantizing an amplitude and a phase of at least one element in the estimation value of the angle domain channel, or comprises a value obtained by quantizing a real part and an imaginary part of at least one element in the estimation value of the angle domain channel;
or
the channel state indication information comprises a quantized value of an estimation value of a channel,
wherein the estimation value of the channel is determined based on the K received measurement values of the K reference signals, the K first spatial filtering parameters, and
wherein the channel sparse basis matrix, and the quantized value of the estimation value of the channel comprises a value obtained by quantizing an amplitude and a phase of at least one element in the estimation value of the channel; or comprises a value obtained by quantizing a real part and an imaginary part of at least one element in the estimation value of the channel.

14. The method of claim 13, wherein the channel state indication information further comprises at least one of the following information: an index of the at least one element of the estimation value of the angle domain channel in the estimation value of the angle domain channel, or a snapshot index of the channel.

15. The method of claim 14, wherein the estimation value $\hat{x}$ of the angle domain channel satisfying the following:

$$\hat{x} = \min_{x} |x|_0 \text{ s.t. } |y - MDx|^2 \leq \epsilon,$$

wherein
y is a received signal, M is a matrix comprising the K first spatial filtering parameters, D is the channel sparse basis matrix of the channels between the first device and the second device that is indicated by the third information, and $\epsilon$ is a preset value.

16. A terminal device comprising:
a processor;
a memory coupled to the processor and having a computer program code stored thereon which upon execution by the processor causes the terminal device to perform:
receiving configuration information from a first device, wherein the configuration information comprises first information, second information, and third information, the first information is indication information of K reference signals, the second information is indication information of K first spatial filtering parameters associated with the K reference signals, the third information is indication information of a channel sparse basis matrix of channels between the first device and the terminal device, and K is an integer greater than 1;

receiving the K reference signals from the first device; and sending channel state indication information to the first device, wherein the channel state indication information is determined based on K received measurement values of the K reference signals, the K first spatial filtering parameters, and the channel sparse basis matrix.

17. The terminal device of claim 16, wherein there is a correspondence between one of the K reference signals and one of the K first spatial filtering parameters.

18. The terminal device of claim 17, wherein the second information comprises K row indexes or column indexes in an analog precoding codebook;

the K row indexes or column indexes indicate K analog precoding vectors in the analog precoding codebook; and the K first spatial filtering parameters are the K analog precoding vectors indicated by the second information, and the analog precoding codebook is preconfigured or configured by default.

19. A terminal device comprising:

a processor;

a memory coupled to the processor and having a computer program code stored thereon which upon execution by the processor causes the terminal device to perform sending configuration information to a second device, wherein the configuration information comprises first information, second information, and third information, the first information indicates K reference signals, the second information indicates K first spatial filtering parameters associated with the K reference signals, and the third information indicates a channel sparse basis matrix of channels between a first device and the second device;

sending the K reference signals to the second device; and receiving channel state indication information from the second device, wherein the channel state indication information is determined based on K received measurement values of the K reference signals, the K first spatial filtering parameters, and the channel sparse basis matrix.

20. The terminal device of claim 19, wherein the channel state indication information comprises a quantized value of an estimation value of an angle domain channel, wherein the estimation value of the angle domain channel is determined based on the K received measurement values of the K reference signals, the K first spatial filtering parameters, and the channel sparse basis matrix, wherein and the quantized value of the estimation value of the angle domain channel comprises a value obtained by quantizing an amplitude and a phase of at least one element in the estimation value of the angle domain channel, or comprises a value obtained by quantizing a real part and an imaginary part of at least one element in the estimation value of the angle domain channel;

or the channel state indication information comprises a quantized value of an estimation value of a channel, wherein the estimation value of the channel is determined based on the K received measurement values of the K reference signals, the K first spatial filtering parameters, and the channel sparse basis matrix, and wherein the quantized value of the estimation value of the channel comprises a value obtained by quantizing an amplitude and a phase of at least one element in the estimation value of the channel; or comprises a value obtained by quantizing a real part and an imaginary part of at least one element in the estimation value of the channel.

* * * * *